(12) United States Patent
Kim et al.

(10) Patent No.: US 10,999,722 B2
(45) Date of Patent: May 4, 2021

(54) METHOD FOR PERFORMING SIDELINK COMMUNICATION IN WIRELESS COMMUNICATION SYSTEM AND DEVICE THEREFOR

(71) Applicant: LG Electronics Inc., Seoul (KR)

(72) Inventors: Myoungseob Kim, Seoul (KR); Hanbyul Seo, Seoul (KR); Seungmin Lee, Seoul (KR); Hyukjin Chae, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/484,085

(22) PCT Filed: Feb. 6, 2018

(86) PCT No.: PCT/KR2018/001613
§ 371 (c)(1),
(2) Date: Aug. 6, 2019

(87) PCT Pub. No.: WO2018/143786
PCT Pub. Date: Aug. 9, 2018

(65) Prior Publication Data
US 2020/0008030 A1    Jan. 2, 2020

Related U.S. Application Data

(60) Provisional application No. 62/500,548, filed on May 3, 2017, provisional application No. 62/476,002, filed
(Continued)

(51) Int. Cl.
*H04W 4/70* (2018.01)
*H04W 24/10* (2009.01)
(Continued)

(52) U.S. Cl.
CPC ............ *H04W 4/70* (2018.02); *H04W 24/10* (2013.01); *H04W 56/001* (2013.01);
(Continued)

(58) Field of Classification Search
None
See application file for complete search history.

(56) References Cited

U.S. PATENT DOCUMENTS

2014/0328329 A1    11/2014  Novlan et al.
2015/0334721 A1    11/2015  Kim et al.
(Continued)

FOREIGN PATENT DOCUMENTS

JP    2016155673    9/2016
JP    2018026625    2/2018
(Continued)

OTHER PUBLICATIONS

Huawei, HiSilicon, "UE autonomous resource selection," R1-160307, 3GPF TSG RAN WG1 Meeting #84, St Julian's, Malta, dated Feb. 6, 2016, 8 pages.
(Continued)

*Primary Examiner* — Rebecca E Song
(74) *Attorney, Agent, or Firm* — Fish & Richardson P.C.

(57) ABSTRACT

The present invention discloses a method for performing sidelink communication in a wireless communication system and a device therefor. Specifically, the method, performed by a first terminal, includes: a process for receiving, from a base station, resource pool allocation information which indicates at least one resource pool from among a plurality of preset resource pools; a process for identifying, in the at least one resource pool, a specific sidelink resource for a second terminal; and a process for transmitting, to the second terminal, a signal for allocating the identified specific sidelink resource, wherein the specific sidelink resource can
(Continued)

be allocated for a signal for performing sidelink measurement between the first terminal and the second terminal.

16 Claims, 13 Drawing Sheets

Related U.S. Application Data on Mar. 24, 2017, provisional application No. 62/459,618, filed on Feb. 16, 2017, provisional application No. 62/454,949, filed on Feb. 6, 2017.

(51) Int. Cl.
*H04W 56/00* (2009.01)
*H04W 72/04* (2009.01)
*H04W 80/08* (2009.01)
*H04W 92/20* (2009.01)

(52) U.S. Cl.
CPC ....... *H04W 72/0493* (2013.01); *H04W 80/08* (2013.01); *H04W 92/20* (2013.01)

(56) References Cited

U.S. PATENT DOCUMENTS

| | | | |
|---|---|---|---|
| 2016/0135143 A1* | 5/2016 | Won | H04W 12/08 370/312 |
| 2016/0295624 A1 | 10/2016 | Novlan et al. | |
| 2016/0309355 A1 | 10/2016 | Seo et al. | |
| 2016/0338094 A1* | 11/2016 | Faurie | H04W 72/085 |
| 2017/0230938 A1* | 8/2017 | Huang | H04W 72/02 |
| 2017/0257787 A1* | 9/2017 | Regueira Caumel | H04W 24/10 |
| 2019/0208441 A1* | 7/2019 | Wang | H04W 28/0284 |
| 2019/0320361 A1* | 10/2019 | Uchiyama | H04W 88/04 |

FOREIGN PATENT DOCUMENTS

| | | |
|---|---|---|
| WO | WO2015088276 | 6/2015 |
| WO | WO2016060524 | 4/2016 |

OTHER PUBLICATIONS

Japanese Office Action in Japanese Appln. No. 2019-542420, dated Sep. 29, 2020, 11 pages (with English translation).
Extended European Search Report in European Application No. 18747339.2, dated Nov. 18, 2020, 8 pages.
Intel Corporation, "Sidelink congestion control for V2X services," R1-1611925, 3GPP TSG RAN WG1 Meeting #87, Reno, USA, dated Nov. 14-18, 2016, 6 pages.
JP Notice of Allowance in Japanese Appln. No. 2019-542420, dated Feb. 2, 2021, 5 pages (with English translation).
Korean Notice of Allowance in Korean Application No. 10-2019-7022774, dated Feb. 17, 2021, 5 pages (with English translation).

\* cited by examiner

METHOD FOR PERFORMING SIDELINK COMMUNICATION IN WIRELESS COMMUNICATION SYSTEM AND DEVICE THEREFOR

CROSS-REFERENCE TO RELATED APPLICATIONS

This application is a National Stage application under 35 U.S.C. § 371 of International Application No. PCT/KR2018/001613, filed on Feb. 6, 2018, which claims the benefit of U.S. Provisional Application No. 62/500,548, filed on May 3, 2017, U.S. Provisional Application No. 62/476,002, filed on Mar. 24, 2017, U.S. Provisional Application No. 62/459,618, filed on Feb. 16, 2017, and U.S. Provisional Application No. 62/454,949, filed on Feb. 6, 2017. The disclosures of the prior applications are incorporated by reference in their entirety.

TECHNICAL FIELD

The present invention relates to a wireless communication system and, more particularly, to a method for performing sidelink communication of a group unit and an apparatus supporting the same.

BACKGROUND ART

Mobile communication systems have been generally developed to provide voice services while guaranteeing user mobility. Such mobile communication systems have gradually expanded their coverage from voice services through data services up to high-speed data services. However, as current mobile communication systems suffer resource shortages and users demand even higher-speed services, development of more advanced mobile communication systems is needed.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive multiple input multiple output (MIMO), in-band full duplex, non-orthogonal multiple access (NOMA), supporting super-wide band, and device networking, have been researched.

DISCLOSURE

Technical Problem

This specification proposes a method of performing sidelink communication in a wireless communication system and a device therefor.

More specifically, this specification proposes a measurement procedure and synchronization method for performing sidelink communication of a group unit.

To this end, this specification proposes a method of configuring a resource region (or resource pool) for group measurement.

Furthermore, this specification proposes a signal transmission and relay method for group measurement.

Furthermore, this specification proposes a method of setting priority of synchronization reference in group communication.

Furthermore, this specification proposes a method of configuring synchronization reference timing and a method of performing communication.

Furthermore, this specification proposes a relay operation method of a synchronization signal related to group communication.

The technical objects of the present invention are not limited to the aforementioned technical objects, and other technical objects, which are not mentioned above, will be apparently appreciated by a person having ordinary skill in the art from the following description.

Technical Solution

In a method of performing sidelink communication in a wireless communication system according to an embodiment of the present invention, the method performed by a first user equipment (UE) includes receiving, from a base station, resource pool allocation information indicating at least one resource pool among a plurality of pre-configured resource pools, identifying a specific sidelink resource for a second UE in the at least one resource pool, and transmitting, to the second UE, a signal for allocating the identified specific sidelink resource. The specific sidelink resource is allocated for a signal for performing sidelink measurement between the first UE and the second UE.

Furthermore, in the method according to an embodiment of the present invention, the at least one resource pool may be allocated for a specific UE group to which the first UE and the second UE belong.

Furthermore, in the method according to an embodiment of the present invention, the signal for performing the sidelink measurement may include at least one of identity (ID) information of the specific UE group or UE order information within the specific UE group.

Furthermore, in the method according to an embodiment of the present invention, the specific sidelink resource may be identified based on a resource order configured for the second UE. The resource order may be configured based on a pre-configured resource pattern.

Furthermore, in the method according to an embodiment of the present invention, the plurality of pre-configured resource pools may include one or more sub-resource pools configured for each UE group. The resource pool allocation information may be received through higher layer signaling.

Furthermore, in the method according to an embodiment of the present invention, the signal for performing the sidelink measurement may include a counter indicating the validity of the corresponding signal.

Furthermore, the method according to an embodiment of the present invention may further include transmitting, to the second UE, information indicating a new resource pool in which the signal for performing the sidelink measurement may be to be transmitted before the counter expires. The new resource pool may belong to the plurality of pre-configured resource pools.

Furthermore, in the method according to an embodiment of the present invention, the specific sidelink resource may be determined based on at least one of a received signal energy value or a channel busy ratio (CBR) value measured with respect to one or more sidelink resources configuring the at least one resource pool.

Furthermore, in the method according to an embodiment of the present invention, the plurality of pre-configured resource pools may include a specific resource pool for a fall-back operation related to the sidelink measurement procedure. The method may further include transmitting the signal for performing the sidelink measurement in the specific resource pool.

A first user equipment (UE) performing sidelink communication in a wireless communication system according to an embodiment of the present invention includes a transceiver for transmitting or receiving a radio signal and a processor functionally connected to the transceiver. The processor may be configured to receive, from a base station, resource pool allocation information indicating at least one resource pool among a plurality of pre-configured resource pools, identify a specific sidelink resource for a second UE in the at least one resource pool, and transmit, to the second UE, a signal for allocating the identified specific sidelink resource. The specific sidelink resource may be allocated for a signal for performing sidelink measurement between the first UE and the second UE.

Advantageous Effects

According to an embodiment of the present invention, there is an effect in that efficient group management is possible because measurement is performed using signals transmitted/received between UEs when sidelink communication of a group unit is performed.

Furthermore, according to an embodiment of the present invention, there is an effect in that a UE out of the coverage of a base station can perform signal transmission between UEs and can perform efficient group measurement because a specific UE allocates the resource of another UE.

Furthermore, according to an embodiment of the present invention, there is an effect in that an adaptive synchronization procedure can be performed depending on the condition of a UE belonging to a group.

Advantages which may be obtained in the present invention are not limited to the aforementioned effects and other unmentioned advantages will be clearly understood by those skilled in the art from the following description.

DESCRIPTION OF DRAWINGS

The accompanying drawings, which are included herein as a part of a description in order to help understanding of the present disclosure, provide embodiments of the present disclosure, and describe the technical features of the present disclosure with the description below.

MODE FOR INVENTION

Figure 1:
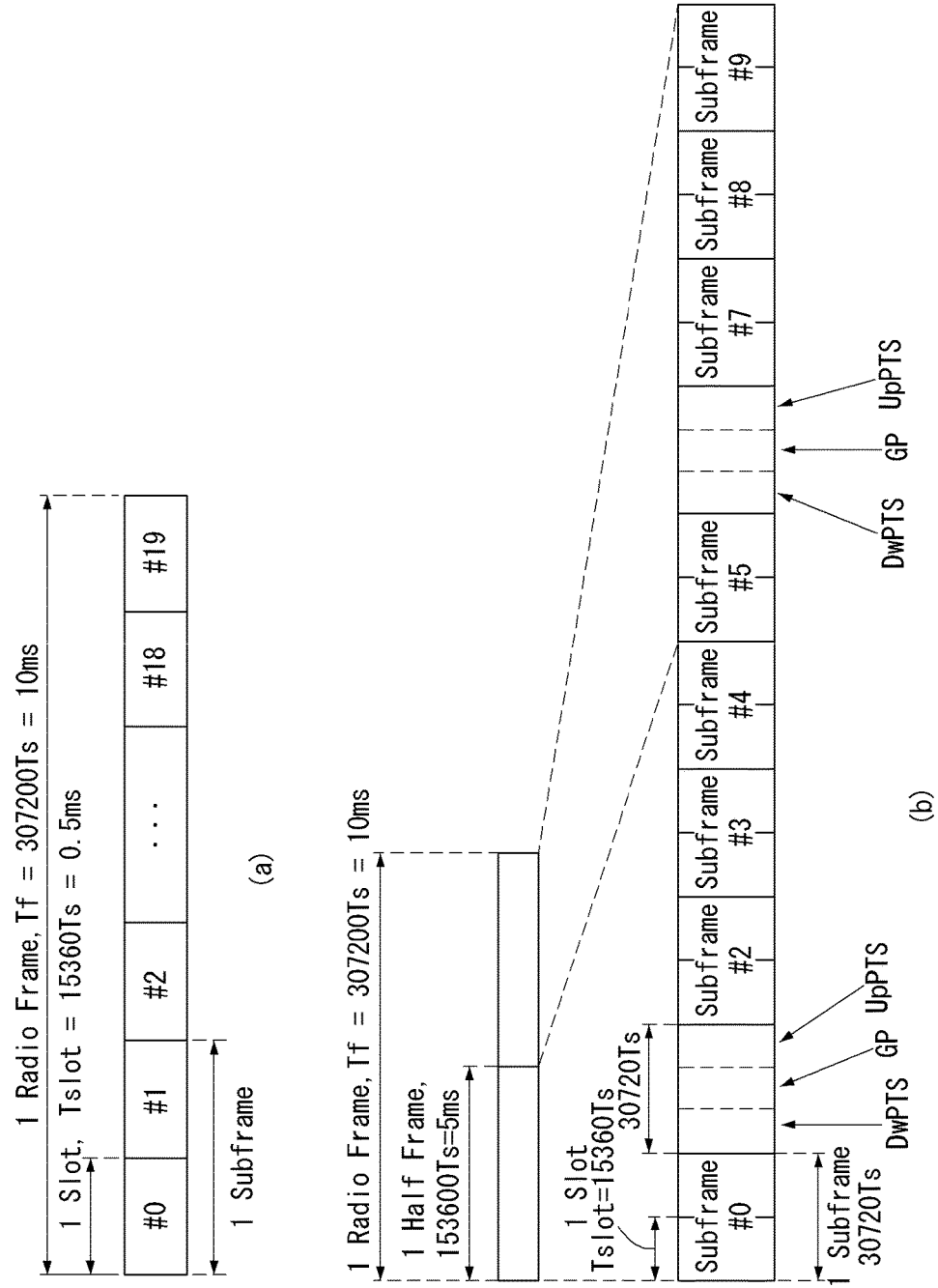
FIG. 1 illustrates the structure of a radio frame in a wireless communication system to which the present invention may be applied.

Some embodiments of the present disclosure are described in detail with reference to the accompanying drawings. A detailed description to be disclosed along with the accompanying drawings is intended to describe some exemplary embodiments of the present disclosure and is not intended to describe a sole embodiment of the present disclosure. The following detailed description includes more details in order to provide full understanding of the present disclosure. However, those skilled in the art will understand that the present disclosure may be implemented without such more details.

In some cases, in order to avoid making the concept of the present disclosure vague, known structures and devices are omitted or may be shown in a block diagram form based on the core functions of each structure and device.

In this specification, a base station has a meaning as a terminal node of a network that directly communicates with a terminal. In this document, a specific operation described as being performed by the base station may be performed by an upper node of the base station in some cases. That is, it is apparent that various operations performed for communication with the terminal in the network constituted by multiple network nodes including the base station may be performed by the base station or network nodes other than the base station. A "base station (BS)" may be replaced with terms including a fixed station, a Node B, an evolved-nodeB (eNB), a base transceiver system (BTS), an access point (AP), a next generation NB, general NB, gNodeB (gNB), and the like. Further, a "terminal" may be fixed or mobile and may be replaced with terms including a mobile station (UE), a mobile station (MS), a user terminal (UT), a mobile subscriber station (MSS), a subscriber station (SS) advanced mobile station (WT), a wireless terminal (WT), a machine-type communication (MTC) device, a machine-to-machine (M2M) device, and a device-to-device (D2D) device, and the like.

Hereinafter, downlink (DL) means communication from a base station to UE, and uplink (UL) means communication from UE to a base station. In DL, a transmitter may be part of a base station, and a receiver may be part of UE. In UL, a transmitter may be part of UE, and a receiver may be part of a base station.

Specific terms used in the following description have been provided to help understanding of the present disclosure, and the use of such specific terms may be changed in various forms without departing from the technical sprit of the present disclosure.

The following technologies may be used in a variety of wireless communication systems, such as code division multiple access (CDMA), frequency division multiple access (FDMA), time division multiple access (TDMA), orthogonal frequency division multiple access (OFDMA), single carrier frequency division multiple access (SC-FDMA), and non-orthogonal multiple access (NOMA). CDMA may be implemented using a radio technology, such as universal terrestrial radio access (UTRA) or CDMA2000. TDMA may be implemented using a radio technology, such as global system for mobile communications (GSM)/general packet radio service (GPRS)/enhanced data rates for GSM evolution (EDGE). OFDMA may be implemented using a radio technology, such as Institute of electrical and electronics engineers (IEEE) 802.11 (Wi-Fi), IEEE 802.16 (WiMAX), IEEE 802.20, or evolved UTRA (E-UTRA). UTRA is part of a universal mobile telecommunications system (UMTS). 3rd generation partnership project (3GPP) Long term evolution (LTE) is part of an evolved UMTS (E-UMTS) using evolved UMTS terrestrial radio access (E-UTRA), and it adopts OFDMA in downlink and adopts SC-FDMA in uplink. LTE-advanced (LTE-A) is the evolution of 3GPP LTE.

Embodiments of the present disclosure may be supported by the standard documents disclosed in at least one of IEEE 802, 3GPP, and 3GPP2, that is, radio access systems. That is, steps or portions that belong to the embodiments of the present disclosure and that are not described in order to clearly expose the technical spirit of the present disclosure may be supported by the documents. Furthermore, all terms disclosed in this document may be described by the standard documents.

In order to more clarify a description, 3GPP LTE/LTE-A/New RAT(NR) is chiefly described, but the technical characteristics of the present disclosure are not limited thereto.

General System

FIG. 1 illustrates the structure of a radio frame in a wireless communication system to which the present invention may be applied.

In 3GPP LTE/LTE-A, radio frame structure type 1 may be applied to frequency division duplex (FDD) and radio frame structure type 2 may be applied to time division duplex (TDD) are supported.

In FIG. 1, the size of the radio frame in the time domain is represented by a multiple of a time unit of $T\_s=1/(15000*2048)$. The downlink and uplink transmissions are composed of radio frames having intervals of $T\_f=307200*T\_s=10$ ms.

FIG. 1(a) illustrates the type 1 radio frame structure. The type 1 radio frame may be applied to both full duplex FDD and half duplex FDD.

The radio frame includes 10 subframes. One radio frame includes 20 slots each having a length of $T\_slot=15360*T\_s=0.5$ ms. Indices 0 to 19 are assigned to the respective slots. One subframe includes two contiguous slots in the time domain, and a subframe i includes a slot 2i and a slot 2i+1. The time taken to send one subframe is called a transmission time interval (TTI). For example, the length of one subframe may be 1 ms, and the length of one slot may be 0.5 ms.

In FDD, uplink transmission and downlink transmission are classified in the frequency domain. There is no restriction to full duplex FDD, whereas a UE is unable to perform transmission and reception at the same time in a half duplex FDD operation.

One slot includes a plurality of orthogonal frequency division multiplexing (OFDM) symbols in the time domain and includes a plurality of resource blocks (RBs) in the frequency domain. An OFDM symbol is for expressing one symbol period because 3GPP LTE uses OFDMA in downlink. The OFDM symbol may also be called an SC-FDMA symbol or a symbol period. The resource block is a resource allocation unit and includes a plurality of contiguous sub-carriers in one slot.

FIG. 1(b) illustrates the type 2 radio frame structure. The type 2 radio frame structure includes 2 half frames each having a length of $153600*T\_s=5$ ms. Each of the half frames includes 5 subframes each having a length of $30720*T\_s=1$ ms.

In the type 2 radio frame structure of a TDD system, an uplink-downlink configuration is a rule showing how uplink and downlink are allocated (or reserved) with respect to all of subframes. Table 1 represents the uplink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, "D" indicates a subframe for downlink transmission, "U" indicates a subframe for uplink transmission, and "S" indicates a special subframe including the three fields of a downlink pilot time slot (DwPTS), a guard period (GP), and an uplink pilot time slot (UpPTS) for each of the subframes of the radio frame.

The DwPTS is used for initial cell search, synchronization or channel estimation by a UE. The UpPTS is used for an eNB to perform channel estimation and for a UE to perform uplink transmission synchronization. The GP is an interval for removing interference occurring in uplink due to the multi-path delay of a downlink signal between uplink and downlink.

Each subframe i includes the slot 2i and the slot 2i+1 each having "$T\_slot=15360*T\_s=0.5$ ms."

The uplink-downlink configuration may be divided into seven types. The location and/or number of downlink subframes, special subframes, and uplink subframes are different in the seven types.

A point of time changed from downlink to uplink or a point of time changed from uplink to downlink is called a switching point. Switch-point periodicity means a cycle in which a form in which an uplink subframe and a downlink subframe switch is repeated in the same manner. The switch-point periodicity supports both 5 ms and 10 ms. In the case of a cycle of the 5 ms downlink-uplink switching point, the special subframe S is present in each half frame. In the case of the cycle of the 5 ms downlink-uplink switching point, the special subframe S is present only in the first half frame.

In all of the seven configurations, No. 0 and No. 5 subframes and DwPTSs are an interval for only downlink transmission. The UpPTSs, the subframes, and a subframe subsequent to the subframes are always an interval for uplink transmission.

Both an eNB and a UE may be aware of such uplink-downlink configurations as system information. The eNB may notify the UE of a change in the uplink-downlink allocation state of a radio frame by sending only the index of configuration information whenever uplink-downlink configuration information is changed. Furthermore, the configuration information is a kind of downlink control information. Like scheduling information, the configuration information may be transmitted through a physical downlink control channel (PDCCH) and may be transmitted to all of UEs within a cell in common through a broadcast channel as broadcast information.

Table 2 represents a configuration (i.e., the length of a DwPTS/GP/UpPTS) of the special subframe.

TABLE 2

| Special subframe configuration | Normal cyclic prefix in downlink | | | Extended cyclic prefix in downlink | | |
| --- | --- | --- | --- | --- | --- | --- |
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | | |
| 5 | $6592 \cdot T_s$ | $4384 \cdot T_s$ | $5120 \cdot T_s$ | $20480 \cdot T_s$ | $4384 \cdot T_s$ | $5120 \cdot T_s$ |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

The structure of the radio frame according to the example of FIG. 1 is only one example. The number of subcarriers included in one radio frame, the number of slots included in one subframe, and the number of OFDM symbols included in one slot may be changed in various manners.

Figure 2:
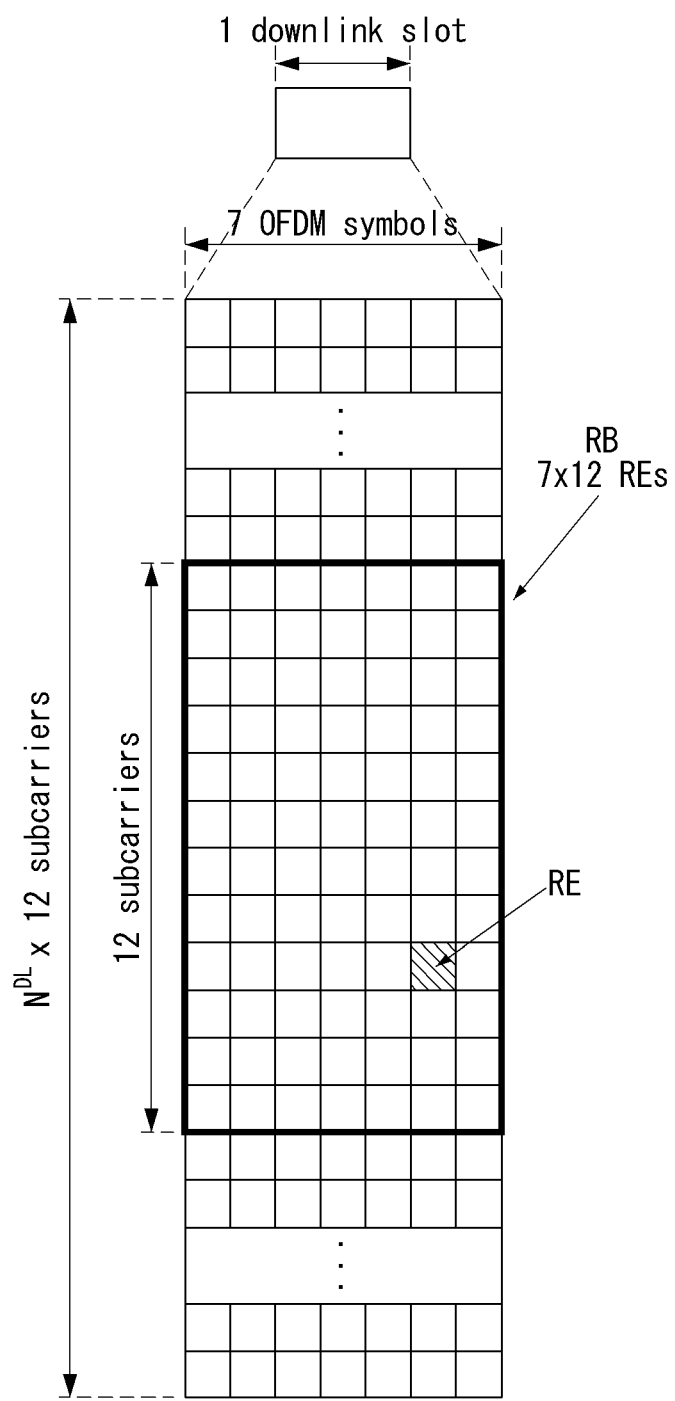
FIG. 2 is a diagram illustrating a resource grid for a downlink slot in a wireless communication system to which the present invention may be applied.

FIG. 2 is a diagram illustrating a resource grid for one downlink slot in the wireless communication system to which the present invention can be applied.

Referring to FIG. 2, one downlink slot includes the plurality of OFDM symbols in the time domain. Herein, it is exemplarily described that one downlink slot includes 7 OFDM symbols and one resource block includes 12 subcarriers in the frequency domain, but the present invention is not limited thereto.

Each element on the resource grid is referred to as a resource element and one resource block includes 12×7 resource elements. The number of resource blocks included in the downlink slot, NDL is subordinated to a downlink transmission bandwidth.

A structure of the uplink slot may be the same as that of the downlink slot.

Figure 3:
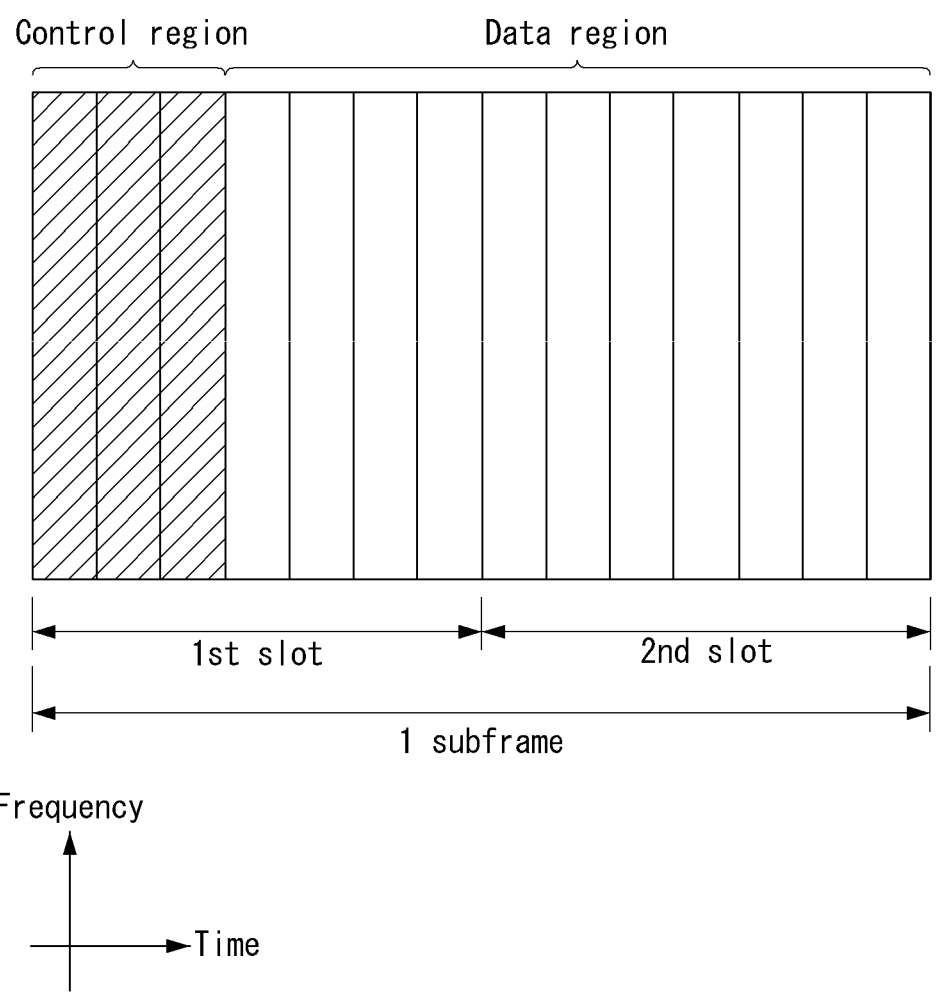
FIG. 3 illustrates a structure of downlink subframe in a wireless communication system to which the present invention may be applied.

FIG. 3 illustrates a structure of a downlink subframe in the wireless communication system to which the present invention can be applied.

Referring to FIG. 3, a maximum of three former OFDM symbols in the first slot of the sub frame is a control region to which control channels are allocated and residual OFDM symbols is a data region to which a physical downlink shared channel (PDSCH) is allocated. Examples of the downlink control channel used in the 3GPP LTE include a Physical Control Format Indicator Channel (PCFICH), a Physical Downlink Control Channel (PDCCH), a Physical Hybrid-ARQ Indicator Channel (PHICH), and the like.

The PFCICH is transmitted in the first OFDM symbol of the subframe and transports information on the number (that is, the size of the control region) of OFDM symbols used for transmitting the control channels in the subframe. The PHICH which is a response channel to the uplink transports an Acknowledgement (ACK)/Not-Acknowledgement (NACK) signal for a hybrid automatic repeat request (HARD). Control information transmitted through a PDCCH is referred to as downlink control information (DCI). The downlink control information includes uplink resource allocation information, downlink resource allocation information, or an uplink transmission (Tx) power control command for a predetermined terminal group.

The PDCCH may transport A resource allocation and transmission format (also referred to as a downlink grant) of a downlink shared channel (DL-SCH), resource allocation information (also referred to as an uplink grant) of an uplink shared channel (UL-SCH), paging information in a paging channel (PCH), system information in the DL-SCH, resource allocation for an upper-layer control message such as a random access response transmitted in the PDSCH, an aggregate of transmission power control commands for individual terminals in the predetermined terminal group, a voice over IP (VoIP). A plurality of PDCCHs may be transmitted in the control region and the terminal may monitor the plurality of PDCCHs. The PDCCH is constituted by one or an aggregate of a plurality of continuous control channel elements (CCEs). The CCE is a logical allocation wise used to provide a coding rate depending on a state of a radio channel to the PDCCH. The CCEs correspond to a plurality of resource element groups. A format of the PDCCH and a bit number of usable PDCCH are determined according to an association between the number of CCEs and the coding rate provided by the CCEs.

The base station determines the PDCCH format according to the DCI to be transmitted and attaches the control information to a cyclic redundancy check (CRC) to the control information. The CRC is masked with a unique identifier (referred to as a radio network temporary identifier (RNTI)) according to an owner or a purpose of the PDCCH. In the case of a PDCCH for a specific terminal, the unique identifier of the terminal, for example, a cell-RNTI (C-RNTI) may be masked with the CRC. Alternatively, in the case of a PDCCH for the paging message, a paging indication identifier, for example, the CRC may be masked with a paging-RNTI (P-RNTI). In the case of a PDCCH for the system information, in more detail, a system information block (SIB), the CRC may be masked with a system information identifier, that is, a system information (SI)-RNTI. The CRC may be masked with a random access (RA)-RNTI in order to indicate the random access response which is a response to transmission of a random access preamble.

Enhanced PDCCH (EPDCCH) carries UE-specific signaling. The EPDCCH is located in a physical resource block (PRB) that is set to be terminal specific. In other words, as described above, the PDCCH can be transmitted in up to three OFDM symbols in the first slot in the subframe, but the EPDCCH can be transmitted in a resource region other than the PDCCH. The time (i.e., symbol) at which the EPDCCH in the subframe starts may be set in the UE through higher layer signaling (e.g., RRC signaling, etc.).

The EPDCCH is a transport format, a resource allocation and HARQ information associated with the DL-SCH and a transport format, a resource allocation and HARQ information associated with the UL-SCH, and resource allocation information associated with SL-SCH (Sidelink Shared Channel) and PSCCH Information, and so on. Multiple EPDCCHs may be supported and the terminal may monitor the set of EPCCHs.

The EPDCCH can be transmitted using one or more successive advanced CCEs (ECCEs), and the number of ECCEs per EPDCCH can be determined for each EPDCCH format.

Each ECCE may be composed of a plurality of enhanced resource element groups (EREGs). EREG is used to define the mapping of ECCE to RE. There are 16 EREGs per PRB pair. All REs are numbered from 0 to 15 in the order in which the frequency increases, except for the RE that carries the DMRS in each PRB pair.

The UE can monitor a plurality of EPDCCHs. For example, one or two EPDCCH sets may be set in one PRB pair in which the terminal monitors the EPDCCH transmission.

Different coding rates can be realized for the EPCCH by merging different numbers of ECCEs. The EPCCH may use localized transmission or distributed transmission, which may result in different mapping of the ECCE to the REs in the PRB.

Figure 4:
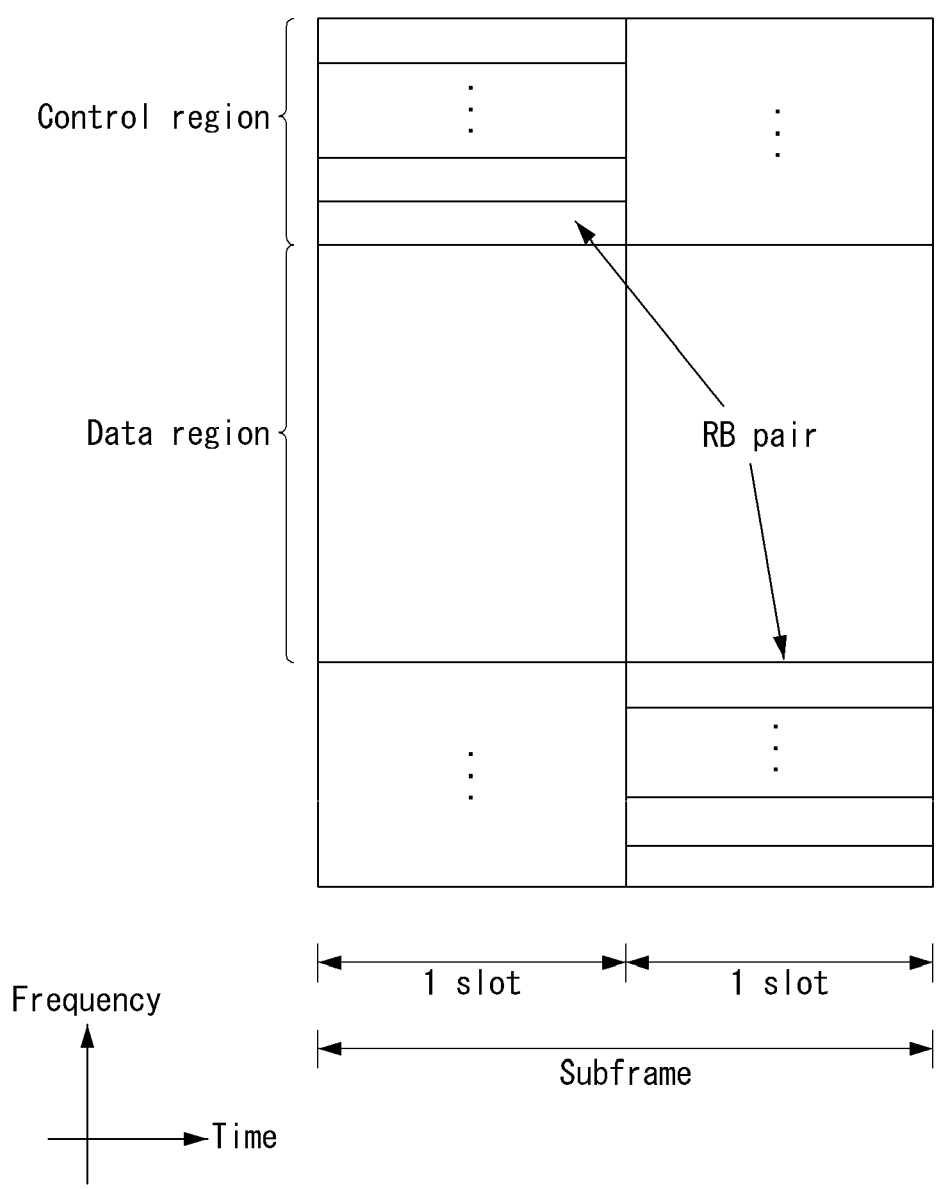
FIG. 4 illustrates a structure of uplink subframe in a wireless communication system to which the present invention may be applied.

FIG. 4 illustrates a structure of an uplink subframe in the wireless communication system to which the present invention can be applied.

Referring to FIG. 4, the uplink subframe may be divided into the control region and the data region in a frequency domain. A physical uplink control channel (PUCCH) transporting uplink control information is allocated to the control region. A physical uplink shared channel (PUSCH) transporting user data is allocated to the data region. One terminal does not simultaneously transmit the PUCCH and the PUSCH in order to maintain a single carrier characteristic.

A resource block (RB) pair in the subframe are allocated to the PUCCH for one terminal. RBs included in the RB pair occupy different subcarriers in two slots, respectively. The RB pair allocated to the PUCCH is frequency-hopped in a slot boundary.

Device-to-Device (D2D) Communication

Figure 5:
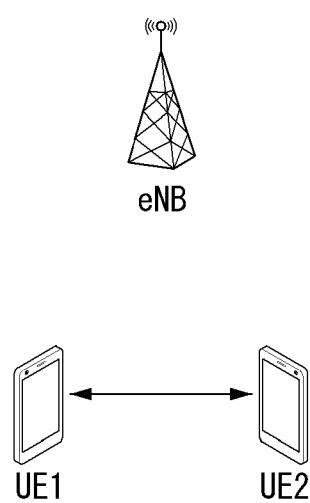
FIG. 5 is a diagram for illustrating elements for a direct communication (D2D) scheme between UEs.

FIG. 5 is a diagram for illustrating elements for a direct communication (D2D) scheme between UEs.

In FIG. 5, a UE means the terminal of a user. If network equipment, such as an eNB, transmits/receives a signal according to a communication method with a UE, the corresponding network equipment may also be considered as a kind of UE. Hereinafter, a UE1 may operate to select a resource unit corresponding to a specific resource within a resource pool that means a set of a series of resources and to transmit a D2D signal using the corresponding resource unit. A UE2, that is, a reception UE corresponding to the UE1, is configured with a resource pool in which the UE1 may transmit a signal, and detects the signal of the UE1 within the corresponding pool. In this case, the resource pool may be notified by a base station if the UE1 is within the coverage of the base station and may be notified by another UE or may be determined as a predetermined resource if the UE1 is out of the coverage of the base station. In general, a resource pool may include a plurality of resource units. Each UE may select one or a plurality of resource units and use it for its own D2D signal transmission.

Figure 6:
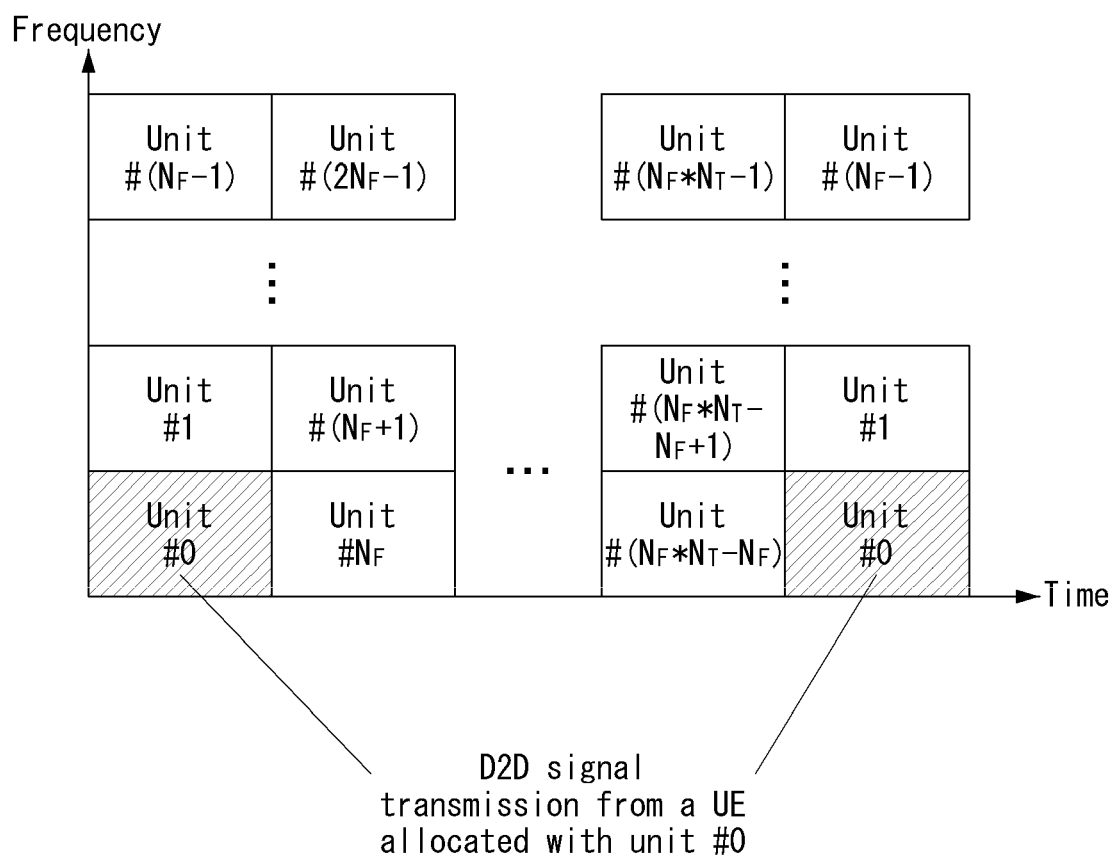
FIG. 6 is a diagram showing an embodiment of the configuration of a resource unit.

FIG. 6 is a diagram showing an embodiment of the configuration of a resource unit.

Referring to FIG. 6, all frequency resources may be divided into N_F, and all time resources may be divided into N_T, so a total of N_F*N_T resource units may be defined. In this case, a corresponding resource pool may be represented as being repeated based on the periodicity of an N_T subframe. Characteristically, one resource unit may appear periodically and repeatedly as shown in this drawing. Alternatively, in order to obtain a diversity effect in a time or frequency dimension, the index of a physical resource unit to which one logical resource unit is mapped may vary in a predetermined pattern over time. In such a resource unit structure, a resource pool may mean a set of resource units which may be used for transmission by a UE that attempts to transmit a D2D signal.

The above-described resource pool may be subdivided into several types. First, the resource pool may be classified based on the contents of a D2D signal transmitted in each resource pool. For example, the contents of a D2D signal may be classified as follows. A separate resource pool may be configured in each one.

Scheduling assignment (SA): a signal including information, such as the location of a resource used for the transmission of a D2D data channel performed by each transmission UE and a modulation and coding scheme (MCS) or an MIMO transmission method and/or a timing advance necessary for the demodulation of other data channel. The signal may be multiplexed with D2D data and transmitted on the same resource unit. In this specification, an SA resource pool may mean a pool of resources in which SA is multiplexed with D2D data and transmitted, and may be denoted as a D2D control channel.

D2D data channel: a resource pool which is used by a transmission UE to transmit user data using a resource designated through SA. If a resource pool can be multiplexed with D2D data and transmitted on the same resource unit, only a D2D data channel of a form other than SA information may be transmitted in a resource pool for the D2D data channel. In other words, a resource element used to transmit SA information on each resource unit within an SA resource pool may be still used to transmit D2D data in a D2D data channel resource pool.

Discovery channel: a resource pool for a message that enables a transmission UE to be discovered by an adjacent UE by transmitting information, such as its own ID.

On the contrary, although the contents of a D2D signal are the same, a different resource pool may be used depending on the transmission/reception attributes of the D2D signal. For example, although a D2D data channel or a discovery message is the same, it may be classified as a different resource pool depending on a transmission timing determination method (e.g., it is transmitted in the reception timing of a sync reference signal or transmitted in corresponding timing by applying a given timing advance) or a resource allocation method (e.g., an eNB designates the transmission resource of each signal with respect to each transmission UE or each transmission UE autonomously selects each signal transmission resource within a pool) of a D2D signal, a signal format (e.g., number of symbols occupied by each D2D signal in one subframe or the number of subframes used for the transmission of one D2D signal), signal intensity from an eNB, transmission power intensity of a D2D UE, etc.

In this specification, for the sake of description, a method of directly indicating, by an eNB, the transmission resource of a D2D transmission UE in D2D or V2V communication is denoted/defined as Mode 1 or Mode 3, and a method of pre-configuring a transmission resource region or designating, by an eNB, a transmission resource region and directly selecting, by a UE, a transmission resource is denoted/defined as Mode 2 or Mode 4. In the case of D2D discovery, if an eNB directly indicates a resource, this is denoted/defined as Type 2. If a resource region is pre-configured or a UE directly selects a transmission resource in a resource region indicated by an eNB, this is denoted/defined as Type 1.

The above-described D2D may be called a sidelink. SA may be called a physical sidelink control channel (PSCCH), a D2D synchronization signal may be called a sidelink synchronization signal (SSS), and a control channel in which the most basic information is transmitted prior to D2D communication transmitted along with an SSS may be called a physical sidelink broadcast channel (PSBCH) or a physical D2D synchronization channel (PD2DSCH) as another name. A signal that is used by a specific UE in order to notify surroundings of its presence. In this case, the signal may include the ID of the specific UE. Such a channel may be called a physical sidelink discovery channel (PSDCH).

In D2D of Rel. 12, only a D2D communication UE has transmitted a PSBCH along with an SSS, and thus the measurement of the SS is performed using the DMRS of the PSBCH. An out-of-coverage UE measures the DMRS of a PSBCH, and determines whether it may become a synchronization source by measuring reference signal received power (RSRP) of the signal.

When direct communication, such as that described above, is performed between UEs, specific UEs may perform group communication (e.g., group transmission, group reception), if necessary. In this case, the group communication may mean sidelink communication (i.e., control information and data transmission/reception through a sidelink) between UEs belonging to a group. The group may be configured with one or more UEs, and may be configured based on services supported by a UE, the capability of a UE, etc.

In the case of group communication, there may be a UE that measures a corresponding group on behalf of the group, and UE may be denoted as a leading UE. Furthermore, the remaining UEs belonging to the corresponding group may be denoted as the following UEs. Furthermore, the leading UE may be denoted as a relay UE, and the following UE may be denoted as a remote UE.

Specifically, the group communication may mean that a specific UE (e.g., leading UE, a UE assigned with a corresponding authority and mission) within a group transmits a signal, message and/or data to other UEs (e.g., following UEs) within the group for control or other (e.g., broadcasting, Internet, multimedia, a high capacity data traffic) use.

For example, such an example includes a platooning operation method/service in which a group of vehicles perform an operation and/or communication. In this case, when a corresponding platooning operation is performed, basically, a specific UE (e.g., leading UE) may transmit a control signal, a message and/or other data to other UEs in order to guarantee a safe platooning service. Furthermore, additionally, other UEs may also exchange signals with a specific UE or other UEs.

In this case, the contents of the signals and/or data exchanged between the UEs may be determined based on information determined and generated within a group or may be determined based on information generated outside a group (e.g., another group or network). That is, if a corresponding group is present within the range of a network, such as a specific eNB, a method of receiving, by a specific UE (e.g., leading UE), a specific signal, a message and/or data from the eNB and forwarding it to other UEs may also be taken into consideration. In other words, the corresponding method may be a method of receiving, by a specific UE within a group, the signal, message and/or data of an eNB in the form of a relay UE and forwarding it to other UEs corresponding to remote UEs.

For another example, in the case of the group communication, a representative UE of a specific group may operate to transmit a signal, a message and/or data to other remote UEs in the form of a relay UE. Specifically, this may correspond to a form in which a representative UE, such as a smartphone, a tablet, or a wearable device, exchanges signals, messages and/or data with another smartphone, tablet or wearable devices.

The contents of signals and/or data exchanged between UEs may be determined based on information determined and generated within a group or may be determined based on information outside a group (e.g., another group or network). For example, it is assumed that a specific smartphone is present within the range of a network, such as a specific eNB, as a representative UE (or relay UE). In this case, the specific smartphone may receive, from the eNB, a specific signal, a message and/or data and may forward it to other UEs (e.g., other smartphones, tablets or wearable devices).

In the case of the above-described group communication, the state (e.g., link quality, connection state between UEs) of UEs belonging to the corresponding group may continue to be changed. Accordingly, the configuration of a group, that is, a UE configuring the group, may be changed. For example, a specific UE may be excluded from a specific group (e.g., group leaving) or may belong to a new group (e.g., group association). Particularly, if the mobility of UEs, such as vehicle-to-vehicle (V2V) and/or vehicle-to-everything (V2X), is high, the configuration of a group may be changed more frequently.

If UEs belong to an eNB (and/or a specific network), the eNB (or a higher network entity) may manage a group (i.e., UE group) to which the corresponding UEs belong through signaling and/or a physical channel. In this case, signaling and/or a physical channel used for the management of the group may be the existing signaling and/or a physical channel or may have been additionally defined, if necessary.

However, if the mobility of a UE is high, it may be inefficient if an eNB manages a UE group because the eNB connected to the corresponding UE group(s) may be frequently changed (e.g., frequent handover). In this case, a procedure in which UEs directly perform such management of a UE group may be necessary. To this end, additional signaling and/or configuration may be necessary.

Hereafter, this specification proposes methods of performing a measurement procedure for identifying the state (e.g., connection state) of UEs belonging to a UE group and performing a behavior suitable for a specific condition. Furthermore, this specification proposes synchronization execution methods of a UE which may be taken into consideration if a UE(s) performs the above-described group communication.

Hereafter, embodiments described in this specification have been classified for the sake of description, and some elements or characteristics of an embodiment may be included in a different embodiment or may be substituted with elements or characteristics corresponding to a different embodiment. For example, a method described in a second embodiment may be applied to a method described in a first embodiment, and vice versa.

First, a method for a UE to perform group measurement is described. In this case, the group measurement may mean a measurement procedure performed for the management (i.e., group management) of a UE(s) belonging to the UE group. In other words, the group measurement may correspond to one of procedures for the group management.

For example, group measurement may mean a procedure of monitoring, by UEs and/or an eNB, connectivity (i.e., link state) between UEs in order to identify the state of UEs belonging to a group.

In this case, the above-described group measurement procedure may be performed by the existing defined signal (e.g., discovery signal) or may be performed by a measurement signal (e.g., sidelink measurement signal) configured for only group measurement. Furthermore, a specific resource may be separately configured for the above-described group measurement procedure.

Hereafter, 1) a resource configuration method, 2) a transmission method of a measurement signal, and 3) a relay method of a measurement signal related to the above-described group measurement procedure are described specifically.

First Embodiment—Method of Configuring Resource Region for Group Measurement

In the first embodiment, a method of configuring a resource region used to perform group measurement between UEs is described.

The resource region for the above-described group measurement may be defined (or configured) as follows. In this case, the resource region means the resources of a specific range, and may be denoted as a resource pool.

First, a resource region for group measurement may be configured as an uplink resource region used in the existing LTE system. For example, an LTE (WAN) UL region and a region classified as TDM within an UL spectrum may be separately allocated for group measurement. A corresponding method may be efficient if group measurement is performed using a network-assisted method, such as an eNB.

Alternatively, a resource region for group measurement may be configured as the existing sidelink resource region. In this case, the existing sidelink resource region may correspond to a resource region separately configured for a sidelink discovery region, a sidelink scheduling assignment (SA) and/or a data region, or group measurement.

For example, a sidelink discovery region may be used for group measurement. The reason for this is that what a measurement signal used for group measurement is used to check the presence of UEs and the characteristics of a service (and/or signal) may be similar to that of the existing discovery signal (e.g., D2D discovery signal).

For another example, a sidelink SA and/or data region may be used for group measurement. There may be a case where UEs have to autonomously schedule the above-described resource region for the transmission of a measurement signal without the support of a network (e.g., eNB). Furthermore, if specific information (i.e., information related to group measurement) is included in a measurement signal, it may be preferred that a sidelink SA and/or data region is used for group measurement because many resources may be required.

For another example, a separate sidelink resource region may be configured for group measurement. In this case, the separate sidelink resource region may be denoted as a sidelink group discovery region. A method of configuring a separate resource region may be efficient in order to check interference with UEs that do not perform group communication and for resource scheduling between UEs that perform group communication. In this case, the configured separate resource region may be configured so that it is used for the transmission/reception of a signal for group management.

Furthermore, a method of defining a resource region to be used by each group(s) within a region for group measurement configured as described above (i.e., region for group management) may also be taken into consideration. That is, the resource region configured for group measurement may be classified per group.

Figure 7:
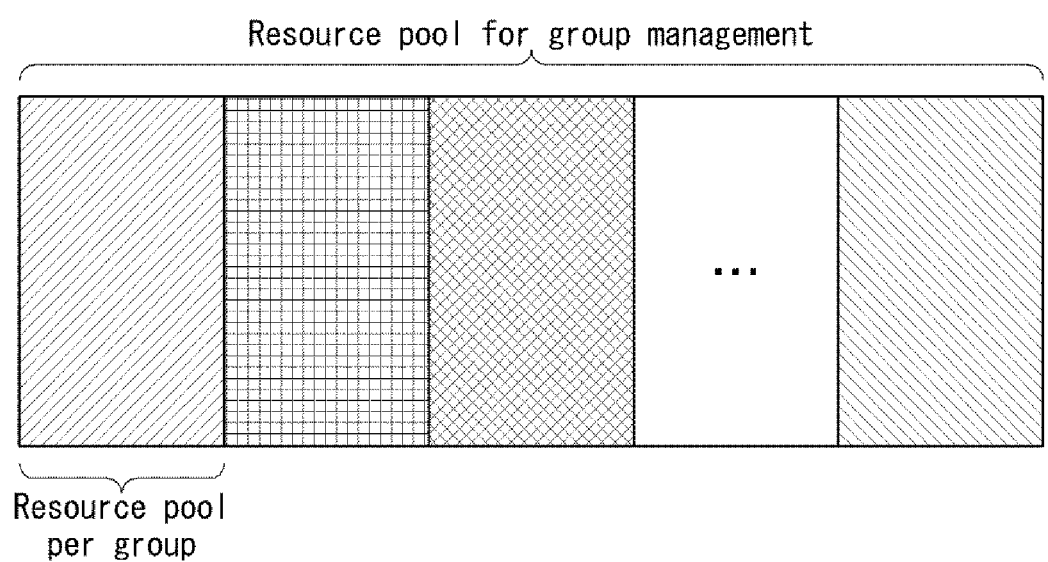
FIG. 7 shows an example of a resource region configuration for group management to which a method proposed in this specification may be applied.

FIG. 7 shows an example of a resource region configuration for group management to which a method proposed in this specification may be applied. FIG. 7 is merely for the sake of description and does not restrict the scope of the present invention.

Referring to FIG. 7, resources (e.g., time-axis resource, subframe unit) configuring the entire resource region (i.e., resource pool) and a resource region per group have been illustrated as being neighbor, but are not limited thereto, and they may be configured to not neighbor. That is, FIG. 7 is an example showing corresponding resources (or resource regions) logically.

If a resource region for group management, such as that described above, is configured like FIG. 7, a resource region per group may occupy some of all the regions. In this case, UE(s) supporting group communication (i.e., capable of performing group transmission service) may be pre-configured with information on the configuration of a resource region, such as that shown in FIG. 7. Alternatively, a corresponding UE(s) may receive the information through higher layer signaling and/or a physical channel by an eNB (or network).

For example, after a UE receive information on a resource pool for group measurement from an eNB, it may additionally receive information indicative of a sub-resource pool for a group to which the corresponding UE in the received resource pool. Alternatively, if a UE has already been configured with a resource pool for group management, the UE may receive only information indicative of a sub-resource pool for a group to which the corresponding UE belongs.

Furthermore, in the case of communication (e.g., communication for a vehicle, such as V2V and/or V2X) having high mobility of a UE, handover or an out-of-coverage condition may frequently occur. In this case, there is a good possibility that UEs performing (or attempting to perform) group communication will identically experience such a condition.

Accordingly, in order for UEs to prepare for a handover operation or for UEs, belonging to out-of-coverage, to perform group transmission service, a method of allocating a resource region for a fall-back mode basically (i.e., by default) may be taken into consideration. In this case, the resource region for a fall-back mode may mean a resource region configured so that a UE uses the resource region if it does not receive resource allocation from an eNB with respect to the transmission/reception of a specific message.

In this case, the UE may be pre-configured with information on a resource region for a fall-back mode, and all UEs supporting group communication may be configured to receive corresponding information identically or semi-statically.

Furthermore, if a UE wants to form a new group, the UE may select a resource region (e.g., sub-resource region) for the corresponding group through a resource region, such as FIG. 7.

For example, if a UE can be supported (or helped) by a network in the state in which it has been connected to an eNB (e.g., D2D mode 1 or V2X mode 3), the UE may receive information indicative of a sub-resource region to be used from the eNB.

For another example, if a UE has to directly select a resource (e.g., D2D mode 2 or V2X mode 4), the UE may select a specific resource region based on a value calculated through a sensing operation for a resource region for group communication. Specifically, a case where a UE performs a sensing operation on a resource region for given duration is assumed. In this case, the UE may select a resource region having the smallest reception energy, among sub-resource regions having energy of a specific threshold (e.g., first threshold) or less.

In this case, the above-described sensing operation and energy detection may be performed within all regions within the corresponding resource region or may be performed only in some regions identified to have been used for signal transmission. Alternatively, the above-described sensing operation and energy detection may be performed on only a region in which a leading UE has transmitted a signal (e.g., the first TTI of each resource region) or a region in which the greatest energy is detected.

If reception energy of all sub-resource regions is a threshold or more, a UE may be configured to select a resource region having the smallest reception energy, among sub-resource regions having a different threshold (e.g., second threshold) or less, or to randomly select a resource region. The above-described thresholds (e.g., first threshold and second threshold) may be pre-defined on a system or may be signaled through a higher layer and/or a physical channel. For example, the second threshold may be set to be equal to or the same as the first threshold.

For another example, if a UE has to directly select a resource, the UE may select a specific resource region using the channel busy ratio (CBR) of a resource region for group communication. In this case, the CBR means the ratio of resources in which a signal level of a given threshold or more is detected for given duration observed (or monitored) by the UE. Specifically, the UE may select a sub-resource region having the lowest CBR value by measuring the CBR value of a resource region for group communication.

Furthermore, signal transmission (e.g., the transmission of a measurement signal) in the above-described resource region may be periodically transmitted in order to indicate the connection state of UEs. In this case, in the above-described energy detection method or CBR value measurement method, the state of a selected sub-resource region(s) may be degraded (e.g., interference increase, resource usage increase) over time.

Accordingly, a resource region per group may be reselected or updated in given periodicity. Such reselection or update may be performed by a specific UE (e.g., leading UE) belonging to a group, and a result of the reselection or update may be reported to another UE (e.g., following UE). Accordingly, all UEs belonging to a group may together perform the reselection of a sub-resource region. However, to this end, all the UEs belonging to the group need to identically share corresponding information (i.e., information on reselection or update results).

For example, a method of indicating, in some field of the above-described measurement signal, a counter (or timer) indicative of the valid period of the corresponding signal may be taken into consideration. Furthermore, before the corresponding counter expires, a specific UE (e.g., leading UE) may forward information on a sub-resource region to be reselected to the remaining UEs.

After the UEs of a corresponding group reselect a sub-resource region, the UE(s) may transmit a measurement signal using the same method that has operated in a previous sub-resource region (i.e., prior to reselection). In this case, only a leading UE may transmit a measurement signal or all UEs (i.e., leading UE and (some of or all) following UEs) may transmit a measurement signal.

However, if a UE belonging to a group(s) has not received the above-described sub-resource region reselection (or update) information, the corresponding UE cannot continuously participate in the corresponding group. Accordingly, a method of maintaining, by a specific UE (e.g., leading UE), a group by transmitting a measurement signal or a corresponding signal using a specific resource region before reselection occurs and/or after reselection has occurred may be taken into consideration.

Figure 8:
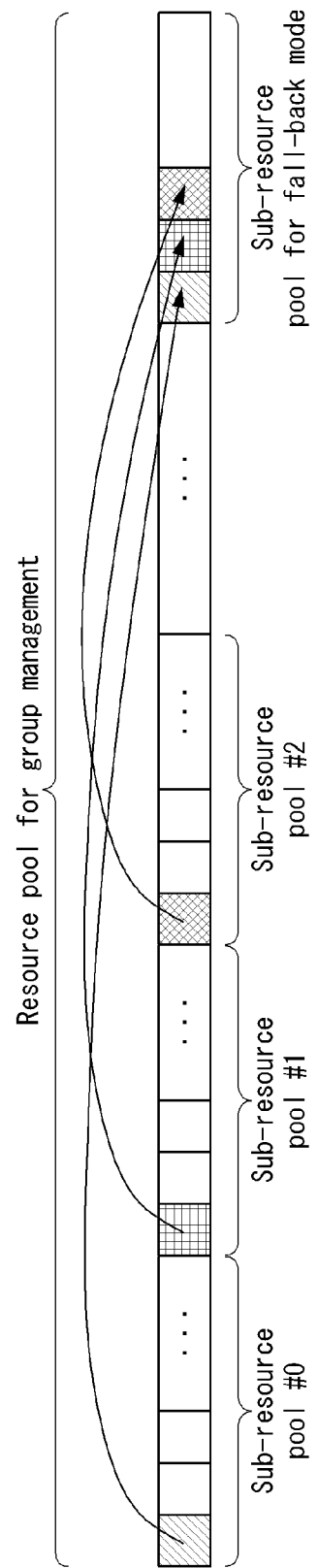
FIG. 8 shows another example of a resource region configuration for group management to which a method proposed in this specification may be applied.

FIG. 8 shows another example of a resource region configuration for group management to which a method proposed in this specification may be applied. FIG. 8 is merely for the sake of description and does not restrict the scope of the present invention.

Referring to FIG. 8, a case where some of a resource region configured for group management is configured for a fall-back mode is assumed.

For example, in preparation for a case where a UE belonging to a group has not received the above-described reselection information, a specific UE may be configured to transmit a measurement signal in a resource region configured for a fall-back mode. In this case, the measurement signal may be a duplicate signal of a previously transmitted signal or may be a signal in which some contents have been modified and/or to which required information (e.g., information on a sub-resource region to be reselected) has been added. In this case, the specific UE may correspond to the leading UE of each group, that is, a leading UE in a sub-resource region corresponding to each group.

Specifically, a UE that transmits a measurement signal in a first sub-resource region (sub-resource region #0) may additionally transmit a measurement signal in a separately configured resource region for a fall-back mode. Likewise, a UE that transmits a measurement signal in a second sub-resource region (sub-resource region #1) may also additionally transmit the measurement signal in a separately configured resource region for a fall-back mode. This may be identically applied to a third sub-resource region (sub-resource region #2). In other words, a specific UE (e.g., leading UE) belonging to each group may be configured to transmit an additional signal in a separately configured resource region.

In this case, a resource region for a fall-back mode may be pre-defined on a system or may be semi-statically configured through higher layer signaling. Furthermore, a signal transmitted in the fall-back mode resource region may be configured to be transmitted from n*P timing prior to the occurrence of reselection to m*P timing after the occurrence of reselection. In this case, P may mean the transmission periodicity of a measurement signal, and n and m may mean an integer that is not negative.

Second Embodiment—Signal Transmission Method for Group Measurement

Next, in the second embodiment, a method of transmitting a signal (e.g., measurement signal) for group measurement between UEs is described.

For example, a case where a specific UE (e.g., leading UE) attempts to activate a group transmission service in a specific resource region (e.g., sub-resource region whose detected reception energy is a second threshold or less) is assumed. In this case, the UE needs to first check that there is no UE transmitting a measurement signal for group transmission in the corresponding resource region. Thereafter, the UE may be configured to transmit the measurement signal in a specific location (or randomly configured location) of the corresponding resource region.

For example, a UE may transmit a measurement signal in the first resource region of a corresponding resource region (i.e., selected (or configured) sub-resource region). In this case, other UEs belonging to a group may be configured to transmit measurement signals through a resource(s) subsequent to the first resource region or may directly select a resource in which a specific signal will be transmitted through a sensing operation. Alternatively, a leading UE and/or an eNB may designate a resource to be used by other UEs belonging to a group, and the order of resources to be used may be defined (or configured).

Figure 9:
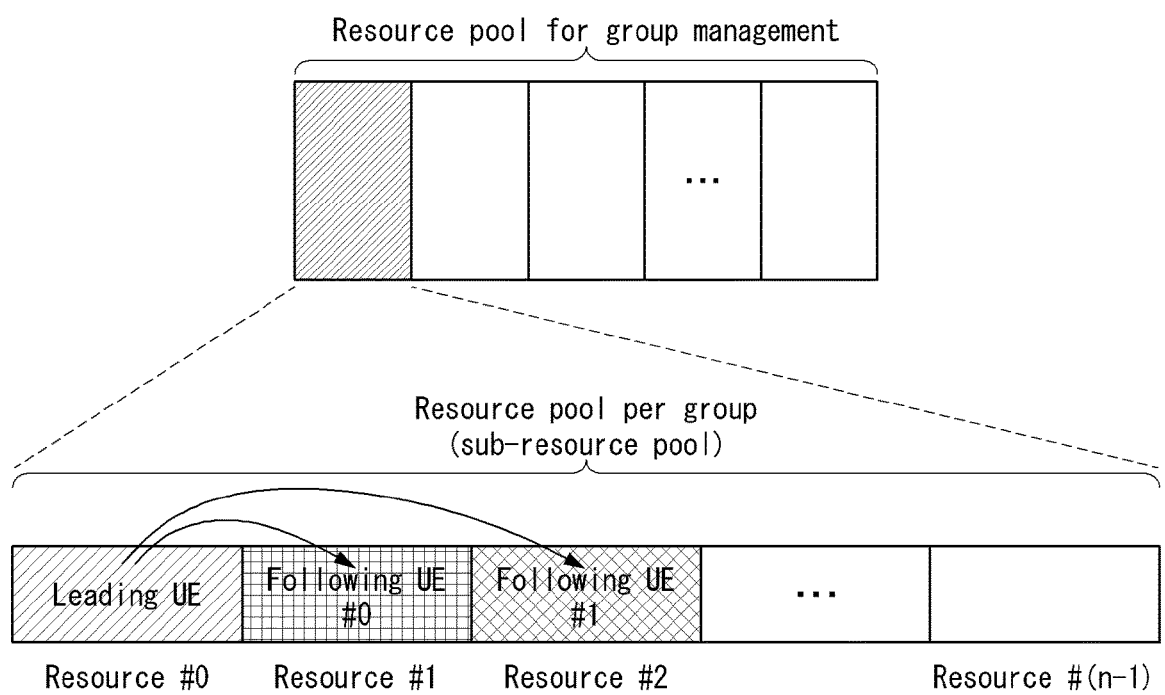
FIG. 9 shows an example of a resource allocation method for a signal for group measurement to which a method proposed in this specification may be applied.

FIG. 9 shows an example of a resource allocation method for a signal for group measurement to which a method proposed in this specification may be applied. FIG. 9 is merely for the sake of description, and does not restrict the range of the present invention.

Referring to FIG. 9, a case where a resource region for group management is configured and the resource region is divided into sub-resource regions per group is assumed. Hereinafter, the description of FIG. 9 is related to a UE operation performed in a specific sub-resource region allocated to a specific group.

A specific sub-resource region may be configured with n resources (e.g., resource #0 to resource #(n−1)). In this case, the location of a resource in which following UEs will transmit a measurement signal may be configured (or allocated) by a leading UE.

In this case, the leading UE may receive information on a resource region and/or a sub-resource region from an eNB, and may configure the resource to be used by the following UEs based on the received information. That is, the leading UE may allocate the resource of the following UE using a network-assisted (or network indication) method.

Specifically, a leading UE belonging to each sub-resource region may be configured to transmit a measurement signal using the first resource (resource #0) of a corresponding sub-resource region. Furthermore, the leading UE may allocate a resource to be used for measurement signal transmission to other UEs (e.g., following UE #0, following UE #1) belonging to a group.

For example, a following UE #0 may be configured to transmit a measurement signal using a second resource (resource #1), and a following UE #1 may be configured to transmit a measurement signal using a third resource (resource #2). In this case, resource regions to be used by the following UEs may be continuously configured or may be discontinuously configured.

Furthermore, a leading UE and a following UE(s) need to be configured to recognize (or identify or confirm) the characteristics of a specific UE using the above-described measurement signal. Furthermore, a UE(s) that wants to belong to a corresponding group also needs to be able to obtain information on the type of service, the type of group using a measurement signal transmitted by a UE belonging to a group(s). Furthermore, the connectivity of UEs belonging to a group may be identified based on information on the actual location of UEs and/or the distance between UEs in addition to the quality of a signal.

In view of this point, the following information may be included (or mapped) in the above-described measurement signal. In this case, the information may be configured and included as each field of the measurement signal or a different type of information may be configured as one field.

First, a measurement signal may include service ID information (e.g., 6-bit information). The service ID information may be used to identify whether a UE corresponds to a group transmission service (i.e., service to be performed through group communication) that the UE want to receive through a measurement signal. However, if a corresponding group transmission service solely uses a specific resource region, the inclusion of service ID information may be optional because a service type may be determined implicitly without service ID information.

Furthermore, group identity (ID) information (e.g., 16-bit information) may include a measurement signal. The group ID information may be used for a UE that wants to belong to a specific group to identify the corresponding group. The group ID information may be generated while a leading UE forms the group or may be allocated by an eNB.

Furthermore, cell ID information (e.g., 9-bit information) may include a measurement signal. If a group transmission service is signaled from a network, it may be preferred that UEs belonging to the same group belong to the same eNB (or cell). Accordingly, in order to check whether a corresponding group belongs to which cell, cell ID information may be included. For example, a UE belonging to a group may receive location information of a cell from an eNB, a leading UE and/or another following UE, while forming a connection with a specific cell. Alternatively, cell ID information may not be necessary in a resource region operating out-of-coverage.

Furthermore, a measurement signal may include order information (e.g., 3-bit information) within a group. Order information within a group may be used to identify that a following UE(s) corresponds to any UE within a group. The size of a field to which corresponding information belongs may be related to the number of resource (e.g., n of FIG. 9) configuring a sub-resource region. For example, if a maximum number of UEs (leading UE and following UE) that may belong to a specific group is n, each sub-resource region may be configured as a maximum of n resources. In this case, information (or field) indicative of order within the group may be represented as a maximum ceil(log 2(n)). In this case, ceil(x) means operation for rounding off to the nearest whole of x.

Furthermore, a measurement signal may include UE ID information (e.g., 16-bit information). The UE ID information of a measurement signal may mean the ID of a UE that transmits the corresponding measurement signal. However, if the above-described group ID information and order information within a group are included in a measurement signal or any UE can be specified through a given condition, UE ID information may not be included in a measurement signal.

Furthermore, a measurement signal may include UE location information. A UE may be aware of whether the corresponding UE belongs to a group or a problem has occurred based on UE location information in addition to a method of measuring link quality using a measurement signal.

For example, if a condition in which the distance between UEs needs to be maintained within a given value has been set, a specific UE (e.g., leading UE) may signal UE location information for a UE(s) so that the corresponding condition is satisfied. Particularly, if all UEs belonging to a specific group are connected to the same cell (or RSU capable of signaling with the corresponding group) and have location information of the corresponding cell, they may reduce the size of UE location information by transmitting only a relative location from the cell.

Specifically, it is assumed that if the distance (i.e., ISD) between eNBs is 1.732 km, UEs can move in an x axis, y axis direction in a range of about +/−1*ISD. In this case, assuming that the interval between lanes is 3 m and resolution of location information is a value (e.g., 2 m) smaller than 3 m, it may be represented as information of 11 bits in each of the x axis and the y axis (i.e., total 22 bits).

Meanwhile, in an environment, such as out-of-coverage, if UEs belonging to a group are not connected to a specific cell (or RSU) and do not have a point to be configured as the reference of location information, the transmission of relative location information, that is, that described above, may be impossible. In this case, UE location information may be transmitted using more bits or UE location information may not be included in a measurement signal.

Furthermore, a measurement signal may include timer (or counter) information indicative of the validity (or a valid period) of the measurement signal. In this case, the corresponding information may operate (or start) from timing in which the measurement signal is transmitted. Alternatively, the corresponding information may be used to notify the remaining valid time if a specific UE (e.g., leading UE) attempts to change a resource in which the measurement signal is transmitted.

When a timer value included in corresponding information expires, if additional signaling is not present, a UE may be configured to automatically reselect a resource. However, if the UE has no intention of reselect the resource, the UE may change a corresponding timer to a specific value before the timer is reset or expires, and may transmit a measurement signal.

Furthermore, if a UE wants to belong to an already generated group, an eNB (or network) may indicate that the UE should belong to a group or the UE may directly belong to a group through a sensing operation as in the above-described method.

For example, if the support of a network cannot be received in the state in which a UE is connected to an eNB (e.g., D2D mode 1 or V2X mode 3), the UE may receive information on a list of groups in operation (i.e., group list) and/or a corresponding group(s) from the eNB.

For another example, if a UE has to directly select a group (e.g., D2D mode 2 or V2X mode 4), the UE may select a specific resource region based on a value calculated through a sensing operation for the resource region for group communication. Specifically, a case where a UE performs a sensing operation on a resource region for given duration is assumed. In this case, the UE may identify a group(s) having energy of a specific threshold (e.g., first threshold) or less.

In this case, the above-described sensing operation and energy detection may be performed all regions within a corresponding resource region or may be performed only in some region identified to have been used for signal transmission. Alternatively, the above-described sensing operation and energy detection may be performed on only a region (e.g., the first TTI of each resource region) in which a leading UE transmits a signal or a region in which the greatest energy is detected.

Furthermore, a UE may obtain information on a group through demodulation for a specific region or a plurality of regions within a corresponding resource region. Furthermore, if a UE wants to belong to a group, a group subscription procedure may be performed through a request message (e.g., group join request) transmitted by an eNB. This is possible if a UE uses a support method through a leading UE and/or a network.

Furthermore, if reception energy of all sub-resource regions is the above-described threshold (e.g., threshold 1) or less, a UE may recognize that a currently available group transmission service is not present nearby. In this case, the UE may attempt subscription on a group transmission service again after waiting for a given period or may activate a group transmission service requested by the corresponding UE. If a corresponding UE activates a group transmission service, the corresponding UE may perform the role of the leading UE of a group.

Third Embodiment—Relay Operation Method of Signal for Group Measurement

Next, in the third embodiment, a method of relaying a signal for the above-described group communication (e.g., group transmission) is described.

If group communication is used, a specific UE may identify the presence of an adjacent UE(s), but may be difficult to always identify the presence of all UEs(s) belonging to a group. For example, if only a leading UE within a group transmits a measurement signal and the remaining UEs (e.g., following UEs) directly receive only a measurement signal (i.e., signal measurement signal directly transmitted by a leading UE), there may be a UE(s) that does not receive the corresponding measurement signal.

Accordingly, in receiving a measurement signal, a method of receiving a signal from an adjacent UE(s) and maintaining group transmission without receiving a signal from only a specific UE (e.g., leading UE) may be taken into consideration. In other words, a first following UE may receive a measurement signal transmitted by a leading UE, and may transmit it to a second following UE (i.e., the relay of the measurement signal). In this case, the first following UE may be configured as a relay UE.

In this case, the UE(s) performing the above-described relay operation may be configured as follows.

For example, all UEs belonging to a group may be configured to relay a measurement signal. This is a method in which a UE does not determine whether to perform relay based on a specific criterion, but all UEs relay a received measurement signal.

For another example, a UE having a level of a received measurement signal higher than a given threshold may be configured to relay a measurement signal. In other words, a UE may forward a corresponding signal to another UE(s) without any change (or by changing some information) only when the quality of a signal received from a specific UE (e.g., leading UE) is sufficiently good. Accordingly, a UE having a signal of not sufficiently good quality received from a specific UE may have an opportunity to receive a relay signal from an adjacent UE(s).

In this case, the UE may consider a signal of higher quality as a measurement signal by comparing the signal quality of a direct link (i.e., link with a leading UE) with the signal quality of a relay link (i.e., link with an adjacent relay UE), and may determine whether to maintain a group. However, a UE(s) whose quality of a signal directly received from a specific UE (e.g., leading UE) and a signal received through a relay operation is not suitable cannot receive a corresponding group transmission service.

For another example, a UE having a level of a received measurement signal lower than a given threshold may be configured to relay the measurement signal. Accordingly, what a plurality of UEs within coverage of a signal transmitted by a leading UE performs a relay operation can be restricted. That is, a UE may perform a relay operation for coverage extension if quality of a signal received from a specific UE (e.g., leading UE) is not sufficiently good. However, in this case, the quality of the received signal needs to be a level or more at least capable of decoding.

The above-described relay operation may be performed for only 1 hop or may be maintained for n-hop. A corresponding configuration may be pre-defined on a system and/or may be signaled through a higher layer a physical channel.

Figure 10:
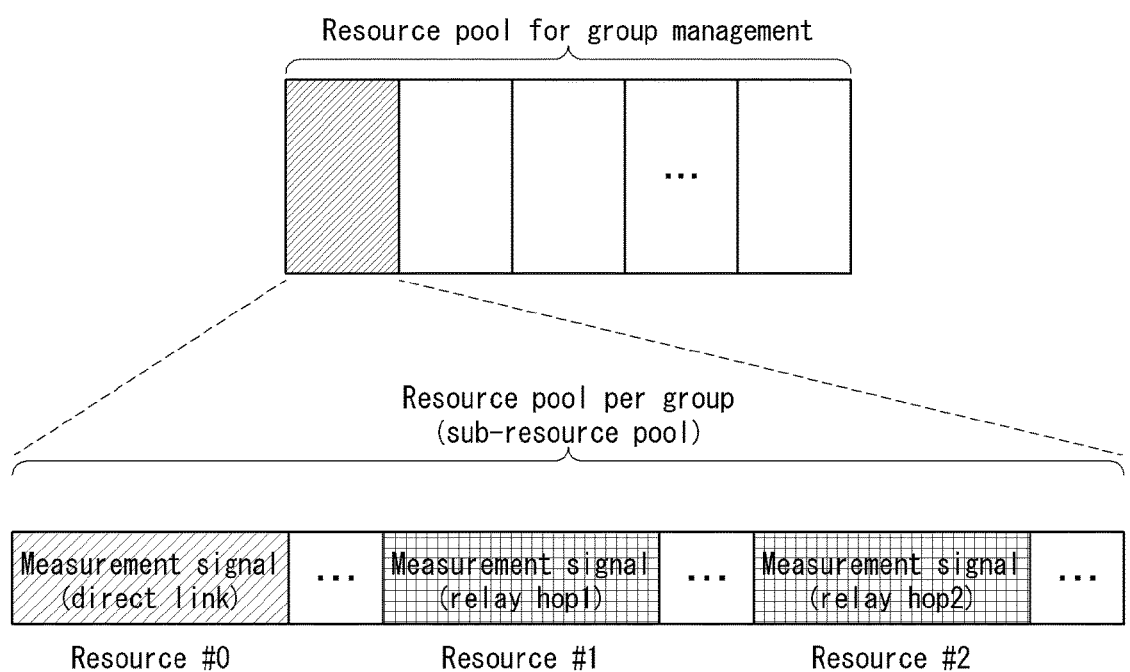
FIG. 10 shows an example of a relay operation of a signal for group measurement to which a method proposed in this specification may be applied.

FIG. 10 shows an example of a relay operation of a signal for group measurement to which a method proposed in this specification may be applied. FIG. 10 is merely for the sake of description and does not restrict the scope of the present invention.

Referring to FIG. 10, a case where a resource region for group management is configured and the corresponding resource region is divided into sub-resource regions per group is assumed.

For example, the leading UE of a corresponding group may transmit a measurement signal in the first resource (resource #0) of a specific sub-resource region. In other words, the first resource may mean a resource corresponding to a direct link related to the transmission of the measurement signal.

A UE(s) that directly performs a relay operation on the measurement signal transmitted in the first resource may transmit the corresponding signal using a second resource (resource #1). In this case, the signal transmitted in the second resource may be denoted as a 1-hop relay signal.

Furthermore, a UE(s) that performs a relay operation on a measurement signal transmitted in the second resource may transmit the corresponding signal using a third resource (resource #2). In this case, the signal transmitted in the third resource may be denoted as a 2-hop relay signal.

Likewise, a signal transmitted in an n-th resource through an n-times relay operation may be denoted as an (n−1)-hop relay signal.

Figure 11:
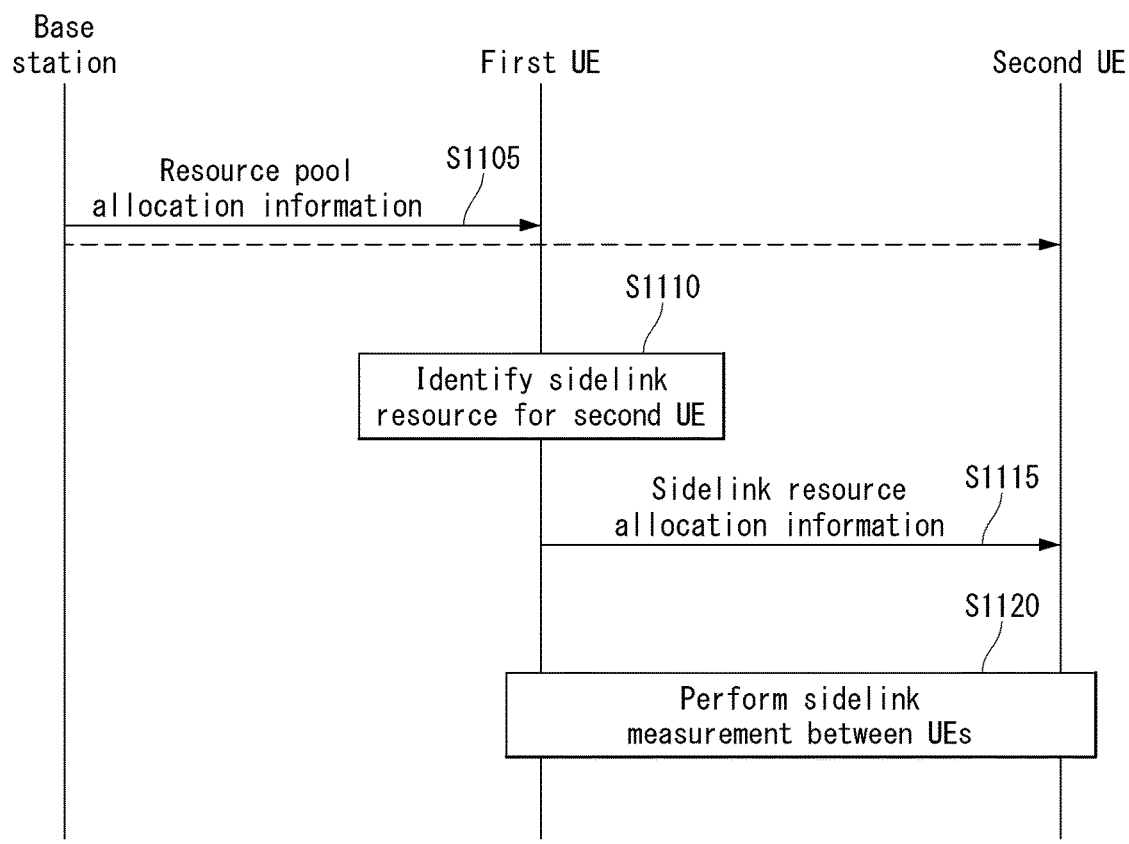
FIG. 11 shows an example of signaling between a base station and UEs, which perform sidelink communication, to which a method proposed in this specification may be applied.

FIG. 11 shows an example of signaling between an eNB and UEs, which perform sidelink communication, to which a method proposed in this specification may be applied. FIG. 11 is merely for the sake of description and does not restrict the scope of the present invention.

Referring to FIG. 11, it is expected that an eNB and a UE may perform the operations described in the first embodiment to the third embodiment. Furthermore, a resource pool described in FIG. 11 may mean a resource region (i.e., given time and/or frequency resource region). Furthermore, a first UE may mean the above-described leading UE (or relay UE), and a second UE may mean the above-described following UE (or remote UE).

At step S1105, the first UE (and second UE) may receive resource pool allocation information. In this case, the resource pool allocation information may mean information indicative of at least one resource pool among a plurality of pre-configured resource pools.

At step S1110, the first UE may identify a specific sidelink resource for the second UE in the at least one resource pool. In this case, the specific sidelink resource is allocated for a signal (e.g., measurement signal) for performing sidelink measurement (e.g., group measurement) between the first UE and the second UE. For example, as shown in FIG. 9, the first UE may identify (or select) the resource #1 or resource #2 for the second UE in the n resources included in the resource pool.

At step S1115, the first UE may transmit a signal for allocating the identified specific sidelink resource (or message, information) to the second UE.

Thereafter, the second UE may transmit a signal in the specific sidelink resource allocated by the first UE. In other words, the first UE may be configured to allocate (or control) a resource to be used by the second UE for the transmission/reception of a specific signal in the resource pool allocated by an eNB.

That is, the first UE may allocate the resource of the second UE according to a network-assisted (or indication) method.

In this case, the at least one resource pool may be allocated for a specific UE group (i.e., UE group providing a specific group service) to which the first UE and the second UE belong.

Furthermore, the signal for performing sidelink measurement may include at least one of ID information (e.g., group identity) of a specific UE group or UE order information within a specific UE group (e.g., order information within a group).

Furthermore, the specific sidelink resource may be identified based on a resource order set for the second UE. The resource order may be set based on a pre-configured resource pattern.

Furthermore, the plurality of pre-configured resource pools includes one or more sub-resource pools configured for each UE group. The resource pool allocation information may be received through higher layer signaling.

Furthermore, the signal for performing sidelink measurement may include a counter (or timer) indicative of the validity of the corresponding signal. In this case, before the counter expires, the first UE may transmit, to the second UE, information indicative of a new resource pool in which the signal for performing sidelink measurement will be transmitted. In this case, the new resource pool may be any one of the plurality of pre-configured resource pools.

Furthermore, the specific sidelink resource may be determined based on at least one of received signal energy values or CBR values measured with respect to one or more sidelink resources that configure the at least one resource pool.

Furthermore, as shown in FIG. 8, the plurality of pre-configured resource pools may include a specific resource pool for a fall-back operation related to the sidelink measurement procedure. In this case, the first UE (e.g., leading UE) may be configured to transmit the signal for performing sidelink measurement (additionally) in the specific resource pool.

Next, synchronization execution methods of a UE which may be taken into consideration if group communication, such as that described above, is performed are described.

If UEs perform group communication, each UE needs to have predetermined timing (or frequency) or the same synchronization reference in order for the transmission/reception of signals to be normally performed between the UEs belonging to the corresponding group. In this case, the synchronization reference may mean synchronization reference timing and/or a synchronization reference frequency.

A method proposed in this specification is described as contents related to synchronization reference timing, but this is merely for the sake of description and may be likewise applied to a synchronization reference frequency.

Hereafter, 1) a priority setting method of synchronization reference timing and 2) a relay method of a synchronization signal related to synchronization in group communication are described specifically.

Fourth Embodiment—Priority Setting Method of Synchronization Reference in Group Communication First, a method of setting priority of a synchronization reference (e.g., synchronization reference timing) if a UE performs group communication is described.

In general, a UE performing group communication (and/or a UE performing a relay operation) within a specific group may be positioned within given coverage from a specific UE (e.g., leading UE). In other words, there is a good possibility that UEs belonging to a corresponding group may be present at geographically close locations.

Accordingly, there is a good possibility that UEs belonging to a group will belong to the same network (e.g., eNB, cell). The UEs may have high similarity in viewpoints, such as the quality of a signal and/or delay of a signal received from a corresponding eNB.

However, if all (or some of) UEs belonging to a corresponding group move, all the moving UEs may experience the same change in a network, such as handover.

Therefore, to determine information transmitted by an eNB as a reference for maintaining a group may not be preferred. Furthermore, if UEs move, information, such as global navigation satellite system (GNSS) timing, may also vary depending on the mobility of a UE.

Accordingly, it may be preferred that UEs performing group communication consider a separately configured group synchronization signal rather than reference timing, that is frequently changed or may be inaccurate, as reference timing. In this case, the reference timing that may be inaccurate may mean reference timing that may cause a synchronization mismatch between UEs belonging to a group.

For example, if group communication is performed (i.e., transmitted/received) in a sidelink region, a method of configuring that a synchronization signal (i.e., a sidelink synchronization signal (SLSS)) for group communication (i.e., group transmission service) defined separately from another sidelink communication is used may be taken into consideration.

In this case, ID information of an SLSS for the group communication (or group communication-related relay operation) may be forwarded to UEs belonging to a group through a pre-defined physical channel or dedicated signaling. For example, the physical channel may correspond to a PSDCH, a PSCCH, a PSSCH, etc. Furthermore, the ID information may be forwarded to a remote UE(s) that performs a relay operation.

In this case, a synchronization signal for group communication may be configured with the highest priority. That is, if a UE belonging to a group can receive a synchronization signal from an eNB, a synchronization signal (i.e., SLSS) transmitted by another UE (e.g., leading UE) belonging to a group may be considered as a synchronization reference signal.

Furthermore, if a UE(s) moves within a cell or between cells of a cellular environment, synchronization timing of an eNB may continue to be changed depending on the movement of the UE (e.g., UE belonging to a group). In this case, a change may be greater than a change in GNSS synchronization timing because it is related to a change in the distance between the UE and the eNB. However, in order to frequently permit a UE(s) to join a group after the UE(s) left the group, shorter synchronization acquisition time may be advantageous.

Accordingly, if a synchronization signal for group communication cannot be used, what a UE performs group communication based on synchronization timing of an eNB rather than GNSS synchronization timing may be preferred.

That is, UEs that perform group communication in a sidelink region may configure synchronization reference timing using an SLSS (or equivalent SLSS thereof) for group communication as the first priority, an eNB synchronization signal (or equivalent synchronization signal thereof) as the second priority, and a GNSS synchronization signal as the third priority.

In other words, a UE that wants to join a specific group may first perform synchronization based on the above-described priority in order to identify whether a group is present and/or to obtain group-related information (e.g., group ID information).

Furthermore, if an SLSS for group communication is not detected, a UE may establish a connection with an eNB by detecting an eNB synchronization signal, and may perform signaling with the eNB in order to continue to attempt group communication (e.g., group communication with the existing formed group(s)). Alternatively, a corresponding UE may generate a synchronization signal (i.e., group synchronization signal) for independent (or based on eNB synchronization timing) group communication, and may start a new group communication operation.

Furthermore, if an eNB synchronization signal is not detected in addition to an SLSS for group communication, a UE may detect a GNSS synchronization signal and configure it as synchronization reference timing. Accordingly, the UE may perform communication with out-of-coverage UEs or may generate a synchronization signal for independent (or based on GNSS synchronization timing) group communication and start a new group communication operation.

If the above-described synchronization reference timing search order is performed, other UEs (e.g., following UE, remote UE) of a corresponding group may prioritize synchronization signal search in order of an SLSS for group communication, an eNB synchronization signal, and a GNSS synchronization signal in order to perform group communication.

In this case, a case where a UE(s) belonging to a group does not need to search for the SLSS of a different group as a representative UE (or relay UE) and directly exchanges signals, messages and/or data for group communication with a network (or eNB) may be taken into consideration. In this case, an SLSS for group communication among the above-described synchronization reference timings may be an SLSS transmitted by a representative UE or may be configured as a signal that does not need to be searched for. That is, the synchronization signal of an eNB among synchronization signals for group communication may be set as the first priority, and a GNSS synchronization signal may become a next order. In other words, if a representative UE (i.e., relay UE) does not need to follow the SLSS of a different UE, it may be configured to follow synchronization timing based on the synchronization signal of an eNB.

Furthermore, in addition to the above-described method, the sequence that a synchronization source is selected may be different depending on the type of service of data packets transmitted/received by UEs. In this case, the synchronization source may mean an entity to which reference may be made when a UE performs synchronization.

That is, the priority of an eNB synchronization signal may be set higher than the priority of an SLSS. For example, in a relay operation, if a remote UE receives, from a relay UE, all signals, messages and/or data related to the relay operation, an SLSS transmitted by the corresponding relay UE may be prioritized compared to other synchronization signals.

However, if some signals, messages and/or data (hereafter Type 1 message) related to a relay operation are transmitted by only an eNB, a remote UE may prioritize an eNB synchronization signal. Likewise, a remote UE may be configured to receive and track an eNB synchronization signal before it performs a relay operation along with a linked relay UE or sets up a connection with a relay UE.

In this case, paging, a system information block (SIB), or an RRC message necessary for the relay operation or other operations may correspond to an example of the Type 1 message. In this case, the remaining signal (e.g., control signal), message and/or data related to the relay operation may be denoted as a Type 2 message.

In this case, if the Type 2 message follows the SLSS transmission timing of the relay UE, it may be a burden for the remote UE to receive and track the SLSS signal, while receiving and tracking the synchronization signal of an eNB.

Accordingly, in such a case, basically, an eNB (or network) may perform a configuration so that the first priority is assigned to the synchronization signal of the eNB and the reference timing of the Type 2 message also follows the synchronization signal of the eNB forwarded from a relay UE to a remote UE. In other words, the remote UE may be configured to be synchronized based on the eNB synchronization timing.

Alternatively, there may be a case where the periodicity of the Type 1 message is much longer than that of the Type 2 message or the transmission of the Type 1 message may be performed sufficiently independently and exclusively with respect to the transmission of the Type 2 message. For example, a configuration may be performed so that paging, a system information block, or an RRC message is transmitted in a very long periodicity.

In this case, a remote UE may be configured to selectively receive and track an eNB synchronization signal and an SLSS, if necessary, before and after a relay operation (or connection operation between a relay UE and remote UEs for the relay operation). That is, an eNB (or network) may configure the remote UE so that it performs an eNB synchronization signal reception and tracking operation and an SLSS signal reception and tracking operation, while switching them.

Furthermore, if there is data (i.e., data packet) to be transmitted by a specific UE, the corresponding UE needs to determine timing in which the corresponding data will be transmitted. In this case, if the corresponding UE (and a UE that needs to receive the data) is implicitly aware of the service type of corresponding data, a synchronization source may be determined based on the service type of data.

Alternatively, a transmission UE and/or a reception UE may explicitly indicate the service type of corresponding data through the corresponding data or a specific control channel (or RRC signaling) related to the corresponding data. For example, a UE may transmit corresponding data by mapping the data to some field (e.g., ProSe per packet priority (PPPP) field, service ID field or configuration index field of DCI) of a control channel (e.g., PDCCH) that schedules the data.

Specifically, the type of service (and the order of a corresponding synchronization source) may be classified based on the priority (e.g., PPPP), the IDs of a source, destination and/or logical channel index of data. For example, a UE may be configured to scan an SLSS, an eNB synchronization signal, a GNSS synchronization signal, and an independent synchronization source (ISS) for group communication. In this case, if 0-7 are assigned to the PPPP values of data exchanged by the UE, values of priority of synchronization sources may be shown like Table 3 based on specific PPPP values.

TABLE 3

| PPPP | 1$^{st}$ priority | 2$^{nd}$ priority | 3$^{rd}$ priority | 4$^{th}$ priority |
|---|---|---|---|---|
| 0~1 | Group communication synch. source | eNB synch. source | GNSS | ISS |
| 2~3 | eNB synch. source | GNSS | ISS | Group communication synch. source |
| 4~5 | GNSS | ISS | Group communication synch. source | eNB synch. source |
| 6~7 | ISS | Group communication synch. source | eNB synch. source | GNSS |

Table 3 is only an example. The range of the PPPP values may be subdivided and may be changed into different values based on the priority of a synchronization source. The mapping relation shown in Table 3 may be pre-defined on a system or may be semi-statically configured through higher layer signaling or may be signaled through a physical channel.

Furthermore, if the type of service (and the order of a corresponding synchronization source) is determined based on the ID of a source UE (i.e., a UE that transmits data) and/or the ID of a destination UE (i.e., a UE that receives data, a destination UE), the following methods may be taken into consideration. For example, in group communication, a source UE may mean a relay UE, and a destination UE may mean a remote UE.

First, the type of service and the order of a corresponding synchronization source may be determined (Method 1) based on an ID value of a source UE. Specifically, if the ID of a destination UE is not limited to only one or a plurality of values (i.e., if a plurality of unspecified UEs may receive the data of a specific service), the type of corresponding service and/or the order of a synchronization source may be determined based on an ID value of a source UE.

For example, the type of service and/or the order of a synchronization source may be determined based on the range of the ID value of a source UE. In this case, a mapping relation for the order of a synchronization source according to the range of the ID value of the source UE may be pre-defined on a system or may be semi-statically determined through higher layer signaling or may be signaled through a physical channel.

For another example, the type of service and/or the order of a synchronization source may be determined depending on that the ID of a source UE belongs to which category (i.e., UE category). In this case, a mapping relation between a category related to the IDs of source UEs and the order of a synchronization source may be pre-defined on a system or may be semi-statically determined through higher layer signaling or may be signaled through a physical channel.

Alternatively, the type of service and the order of a corresponding synchronization source may be determined (Method 2) based on an ID value of a destination UE. Unlike in Method 1, if the ID of a source UE is not limited to only one or a plurality of values (i.e., if a plurality of unspecified UEs may transmit the data of a specific service), the type of a corresponding service and/or the order of a synchronization source may be determined based on an ID value of a destination UE. A mapping relation between the ID of a destination UE, the service type and/or the order of the synchronization source may be the same as that of Method 1.

Alternatively, the type of service and the order of a corresponding synchronization source may be determined (Method 3) based on a combination of an ID value of a source UE and an ID value of a destination UE. This corresponds to a case where the type of a corresponding service and/or the order of a synchronization source are determined based on a combination of a specific source UE(s) and a specific destination UE(s). A mapping relation between a combination of IDs, the service type and/or the order of a synchronization source may be the same as that of Method 1.

For example, the type of service and/or the order of a synchronization source may be determined based on a combination of the range of an ID value of a source UE and the range of an ID value of a destination UE. In this case, a mapping relation for the order of a synchronization source according to a combination of the ID value of the source UE of a specific range and the ID value of the destination UE of a specific range may be pre-defined on a system or may be semi-statically determined through higher layer signaling or may be signaled through a physical channel.

For another example, the type of service and/or the order of a synchronization source may be determined depending on that a combination of an ID value of a source UE and an ID value of a destination UE belongs to which category. In this case, a mapping relation between a category related to a combination of the ID value of the source UE and the ID value of the destination UE and the order of the synchronization source may be pre-defined on a system or may be semi-statically determined through higher layer signaling or may be signaled through a physical channel.

It may be preferred that an SLSS is prioritized because the characteristics of services used in the above-described methods are basically aimed at an operation in a sidelink. However, if it is advantageous that a UE performs communication with an eNB (i.e., if the UE is positioned at a distance very close to the eNB), it may be preferred that the UE performs signaling and/or data transmission/reception with the support of the eNB.

For example, if the reception quality of a synchronization signal (i.e., downlink synchronization signal) (or corresponding signal and channel) of an eNB is a given level or more, a UE belonging to a group may give more priority to an eNB synchronization signal than to other synchronization signals. Alternatively, although time resource or power consumed to maintain downlink synchronization with a corresponding eNB is a given level or less, a UE belonging to a group may prioritize an eNB synchronization signal. In this case, the consumed time resource may mean the time taken to scan the synchronization signal, a time resource consumed to couple a plurality of synchronization signals several times.

In contrast, if the reception quality of a synchronization signal (or corresponding signal and channel) of an eNB is a given level or less or time resource (or power) consumed to maintain downlink synchronization with a corresponding eNB is a given level or more, the reception of an SLSS may be prioritized. The corresponding SLSS may be transmitted by a specific source UE(s) or may be an SLSS related to a combination of a specific source UE(s) and a specific destination UE(s).

Furthermore, as described above, priority between eNBs or SLSSs may be determined based on an absolute value of eNB signal quality or the order of a synchronization source may be determined through a comparison between the signal quality of an eNB and the signal quality of an SLSS (or various types of synchronization sources).

Specifically, if it is advantageous for a UE to operate based on timing of an eNB or to operate according to an eNB assisted method, a weight may be increased by adding an offset of "0" or more to eNB signal quality. Alternatively, if the timing of ISS is intended to be not selected as much as possible, a weight may be reduced by adding an offset of "0" or less to ISS signal quality.

Meanwhile, the above-described signal quality values may be set to be valid when they are a given threshold or more depending on the type of signal. The above-described offset values and/or thresholds may be pre-defined on a system or may be semi-statically determined through higher layer signaling or may be signaled through a physical channel.

Furthermore, as described above, the priority of a synchronization source may be determined based on measurement, but a method of configuring that a combination of a specific type of UEs and/or a specific condition is mapped to a specific synchronization source may be taken into consideration. For example, it is assumed that a specific UE (e.g., wearable device) is served by a relay UE in a remote UE mode. In this case, when the specific UE discovers a synchronization source and/or an SLSS generated from a specific relay UE, the corresponding UE may be configured to give more priority to the corresponding synchronization source than to an eNB. This may be a configuration limited to a UE that operates in a specific service mode or a specific PPPP.

Furthermore, if a remote UE monitors up to an SLSS transmitted by a different UE or group or a resource pool including a corresponding SLSS in addition to an SLSS transmitted by a relay UE related to the remote UE or a resource pool including a corresponding SLSS, unnecessary power may be consumed.

Accordingly, in the case of a group performing a relay operation, a remote UE may be configured by an eNB so that it monitors only a specific SLSS or specific resource pool transmitted by a specific UE (e.g., relay UE) designated by an eNB. Such a configuration may be forwarded through dedicated signaling, such as RRC signaling, or may be dynamically indicated through physical channel signaling.

Furthermore, if a prioritization rule in which an SLSS is followed with the first priority has been defined, indication related to an SLSS resource or an SLSS resource pool has no problem if a relay UE and a remote UE belong to a specific serving eNB together (e.g., in-coverage network). Furthermore, although a remote UE moves to an adjacent eNB, the remote UE may be configured to monitor the SLSS or SLSS resource pool of the existing relay UE without any change.

Furthermore, if a relay UE (or relay UE and remote UE at the same time) moves to an adjacent eNB, a serving eNB may indicate information on a changed SLSS or SLSS resource pool of the relay UE with respect to the relay UE and the remote UE before the relay UE performs handover to the adjacent eNB (or cell). In this case, the relay UE may receive corresponding configuration information through the indication from the adjacent eNB. Such a method may be performed in such a manner that a UE receives changed configuration information from an adjacent eNB after performing handover.

Particularly, if a relay UE and a remote UE move to an adjacent eNB at the same time, before they perform handover to the adjacent eNB, a serving eNB (or an adjacent eNB after handover to the adjacent eNB) may indicate information on the changed SLSS or SLSS resource of the relay UE with respect to the relay UE and the remote UE.

In this case, if the remote UE has not received the SLSS of a corresponding group, the remote UE may directly receive a synchronization signal from a specific relay UE and/or an eNB to which a specific remote UE belongs. In this case, the remote UE may directly receive a signal, a message and/or data for group communication from the eNB in addition to the synchronization signal.

Furthermore, in this case, the corresponding remote UE may function to transmit an SLSS to other UEs based on a synchronization reference, and may function to forward (or receive) a signal, a message and/or data necessary for other UEs. In other words, the role of the remote UE may be changed so that the remote UE operates as a relay UE, if necessary. Such a change in the role may be performed in response to a request from a corresponding remote UE according to the type of transmitted signal, message and/or data or the type of application or may be indicated by an eNB.

Fifth Embodiment—Method of Configuring Synchronization Reference Timing and Perform Communication A method of configuring synchronization reference timing related to the above-described group communication and a method of performing communication between UEs are described below.

If group communication is performed, a UE (e.g., leading UE) that generates a group is adjacent to a different UE (e.g., following UE)(s) that attempts to join the group. In general, the UE may be positioned on the same network (or eNB). Furthermore, although a UE (e.g., following UE) is connected to a neighbor cell, the corresponding UE may perform directly or indirectly signaling with a network (or eNB), belonging to a corresponding group, in order to perform group communication within the group.

Accordingly, a UE (e.g., leading UE) attempting to generate a group may configure the reference timing of corresponding group communication by applying the synchronization reference timing of an eNB or a given offset (e.g., t1). For example, the synchronization reference timing of an eNB may mean timing in which a UE receives a synchronization signal from an eNB.

A UE that has configured synchronization reference timing as described above may transmit a synchronization signal and data based on the corresponding timing, while maintaining a group. Although a corresponding UE simply moves to an adjacent eNB (i.e., neighbor cell), it does not reselect corresponding reference timing (i.e., synchronization reference).

Similar to the above-described method, a UE attempting to generate a group may configure the reference timing of corresponding group communication by applying the synchronization reference timing of GNSS or a given offset (e.g., t1).

In this case, the offset value may be set as a real number having a positive value or a negative value, or may be set to "0." The offset value may be pre-defined on a system or may be semi-statically determined through higher layer signaling or may be signaled through a physical channel.

However, if it is determined that to use the timing of an initially accessed eNB or GNSS does not a great meaning in group communication, a specific UE (e.g., leading UE) may independently configure unique synchronization timing by not taking into consideration the timing of a different synchronization source.

Furthermore, if a US belonging to a specific group performs communication with a UE (e.g., cellular UE)(s) using a different communication method other than a corresponding group, it may follow a common synchronization rule (i.e., synchronization prioritization rule).

For example, in order to perform communication with a UE(s) that transmits/receives based on the transmission timing of an eNB, a UE belonging to a group may perform synchronization based on the transmission timing of the (same) eNB and then perform communication.

Likewise, if a UE belonging to a specific group performs communication with a UE belonging to a different group, the UE needs to perform communication based on corresponding synchronization reference timing by scanning the synchronization signal of an adjacent group other than its own group. This may be identically applied to a case where a UE belonging to a specific group attempts to move to a different group.

Sixth Embodiment—Relay Operation Method of Synchronization Signal Related to Group Communication A method of relaying, by a UE, a synchronization signal related to group communication to a different UE is described below.

In the case of group communication, at least one UE within a group needs to transmit a synchronization signal. For example, if a leading UE transmits a synchronization signal, a different UE(s) positioned near the leading UE may receive the synchronization signal.

However, some UE(s) that want to join group communication may be present out of coverage of the corresponding group communication or may not receive a corresponding synchronization signal because they are blocked by other UEs (or geographic feature).

Particularly, in the case of a vehicle UE (vehicle type UE), a signal may be greatly attenuated due to the blockage of vehicles.

Accordingly, for smooth group communication, a synchronization signal transmitted by a specific UE needs to be relayed by a different UE. In this case, all UEs belonging to a group do not perform the relay operation, but a UE performing the relay operation may be selected according to the following methods.

Method 1: Method of Performing, by all UEs, Relay Operation

This is a method in which whether relay will be performed is not determined based on a specific criterion, but all UEs belonging to a group relay received measurement signals.

Method 2: This is a Method of Performing, by a UE Whose Power of a Received Synchronization Signal is a Given Level or More, a Relay Operation If the quality of a signal received from a specific UE (e.g., leading UE) is sufficiently good, a UE may relay the received signal to other UEs without any change (or by processing or changing some information). Accordingly, UEs having a signal of not sufficiently good quality received from a specific UE may have an opportunity to receive a relay signal from an adjacent UE(s).

Information related to the above-described relay operation may be included in a channel (e.g., physical synchronization control channel) that controls information on synchronization signal transmission. In this case, the information related to the relay operation may include information indicative of a relay signal, a hop counter, information on a maximum hop number.

In this case, all UEs may be configured to transmit a synchronization signal to the same location. That is, an original signal (e.g., synchronization signal transmitted by a leading UE) and a relay signal may be configured to be transmitted in the same resource region. In this case, UEs transmitting a synchronization signal within a group may use a system frame number (SFN) method. In this case, coverage of the synchronization signal may be restricted by a maximum hop number.

In contrast, an original signal and a relay signal and a relay signal may be configured to be transmitted at different locations. Transmission resources may be classified in order to identify whether UEs receiving a relay signal can directly receive the signal from a leading UE or whether they can receive the signal from a relay UE.

In this case, a UE(s) whose quality of the original signal directly received from a specific UE (e.g., leading UE) and quality of the relay signal are not good (i.e., a given level or less) cannot perform corresponding group communication. That is, the UE may compare the signal quality of a direct link with the signal quality of a relay link, may consider the signal of higher quality as an actual synchronization signal, and may determine whether it well tracks a group.

For example, although a UE has received both an original signal and a relay signal, if the original signal is received with higher quality (e.g., power of a given threshold or more), the UE may relay a corresponding synchronization signal (i.e., original signal) regardless of the presence of the relay signal. In contrast, if the relay signal is received with higher quality, the UE may transmit a corresponding relay signal at a specific location based on a maximum hop number of relay.

Method 3: This is a Method of Performing, by a UE Whose Power of a Received Synchronization Signal is a Given Level or Less, a Relay Operation In the case of Method 2, many UEs may perform relay operations within coverage of a signal transmitted by a leading UE. Accordingly, in order to restrict an unnecessary relay operation, a method of configuring that a UE performs a relay operation for a coverage extension only when the quality of a signal received from a specific UE (e.g., leading UE) is not sufficiently good may be taken into consideration.

However, in this case, the received signal needs to be a level or more at least capable of signal decoding.

Method 4: This is a Method of Measuring the Quality of Synchronization Signals and Performing a Relay Operation This is a method of performing, by a UE, a relay operation when power of a specific synchronization signal (or a specific type of synchronization signal), among synchronization signals received by the UE, is higher than a given threshold and power of a different synchronization signal (or a different type of synchronization signal), among the synchronization signal, is lower than the given threshold.

For example, if a UE that receives a synchronization signal (e.g., eNB synchronization signal, SLSS) from a relay UE determines that other UE(s) will well receive the synchronization signal even without a separate relay operation, a remote UE does not need to separately relay the synchronization signal.

In other words, if a UE that receives an SLSS with quality of a given threshold or more (e.g., power) also receives the synchronization signal of an eNB with quality of a given threshold or more (e.g., if the UE is in coverage), the corresponding UE may determine that surrounding UEs may discover at least one signal of an eNB and/or the SLSS at least. Accordingly, the corresponding UE does not need to relay its received synchronization signal to the surrounding UEs.

Likewise, if a UE that receives the SLSS of a specific group with quality of a given threshold or more also receives the SLSS of a different group with quality of a given threshold or more, the corresponding UE may determine that surrounding UEs will discover a signal transmitted by at least one group of a plurality of groups at least. Accordingly, in this case, the corresponding UE does not need to relay its received synchronization signal to the surrounding UEs.

Alternatively, for another example, although a remote UE has receives an SLSS signal with quality of a given threshold or more from a specific group, the corresponding remote UE may not receive a synchronization signal having quality of a given threshold or more from a specific eNB (e.g., configured eNB) or any eNB. That is, a case where the UE corresponds to out-of-coverage from the eNB and receives the SLSS in a specific group may occur. In this case, in order to give other UEs with the opportunity to obtain the synchronization signal, the remote UE may autonomously relay the received SLSS.

Likewise, a case where a UE that has received the SLSS of a specific group with quality of a given threshold or more does not receive the SLSS of any group with quality of a given threshold or more may occur. In this case, a remote UE may determine that surrounding UEs cannot discover an SLSS signal transmitted by any group other than a group to which the remote UE belongs, and thus may relay its received SLSS.

In this case, when the UE(s) positioned near the remote UE receive the related SLSS, the corresponding UE(s) may determine whether the received SLSS has the same type of a configured SLSS or has been transmitted by a group that is capable of communication (or permitted) group. Accordingly, the corresponding UE(s) may determine whether it performs group communication. For example, a wearable device may be synchronized with a surrounding different smartphone or a smartphone may attempt access and/or synchronization with another device.

General Apparatus to which the Present Invention May be Applied

Figure 12:
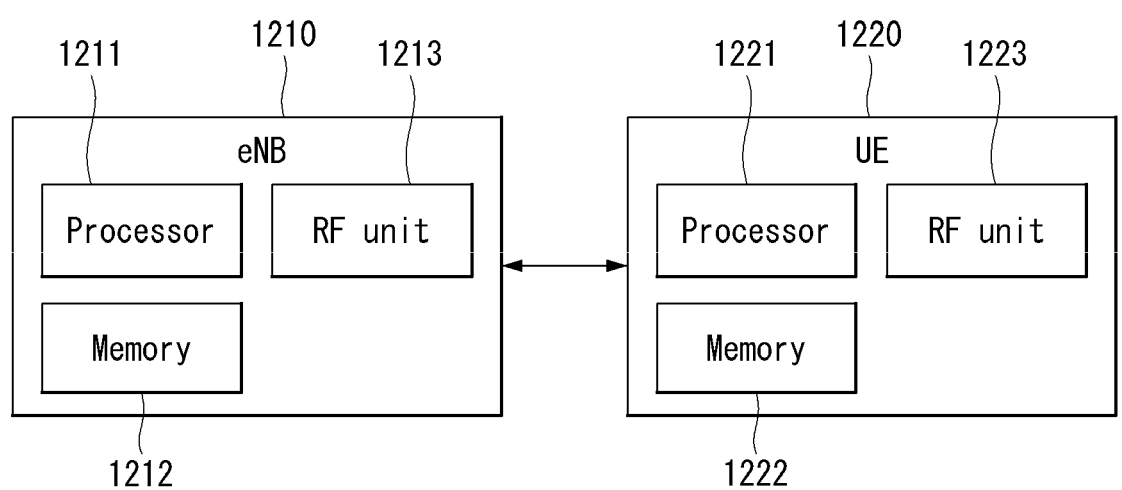
FIG. 12 illustrates a block diagram of a wireless communication device to which methods proposed in this specification may be applied.

FIG. 12 illustrates a block diagram of a wireless communication device to which methods proposed in this specification may be applied.

Referring to FIG. 12, a wireless communication system includes an eNB 1210 and a plurality of UEs 1220 positioned within the area of the eNB 1210.

The eNB 1210 includes a processor 1211, a memory 1212 and a radio frequency (RF) unit 1213. The processor 1211 implements the function, process and/or method proposed in FIGS. 1 to 11. The layers of a radio interface protocol may be implemented by the processor 1211. The memory 1212 is connected to the processor 1211, and stores various pieces of information for driving the processor 1211. The RF unit 1213 is connected to the processor 1211, and transmits and/or receives a radio signal.

The UE 1220 includes a processor 1221, a memory 1222 and an RF unit 1223.

The processor 1221 implements the function, process and/or method proposed in FIGS. 1 to 11. The layers of a radio interface protocol may be implemented by the processor 1221. The memory 1222 is connected to the processor 1221, and stores various pieces of information for driving the processor 1221. The RF unit 1223 is connected to the processor 1221, and transmits and/or receives a radio signal.

The memory 1212, 1222 may be positioned inside or outside the processor 1211, 1221 and may be connected to the processor 1211, 1221 by various well-known means.

For example, in a wireless communication system supporting low latency services, in order to transmit/receive DL data, the UE may include a radio frequency (RF) unit for transmitting/receiving radio signals and a processor functionally connected to the RF unit.

Furthermore, the eNB 1210 and/or the UE 1220 may have a single antenna or multiple antennas.

Figure 13:
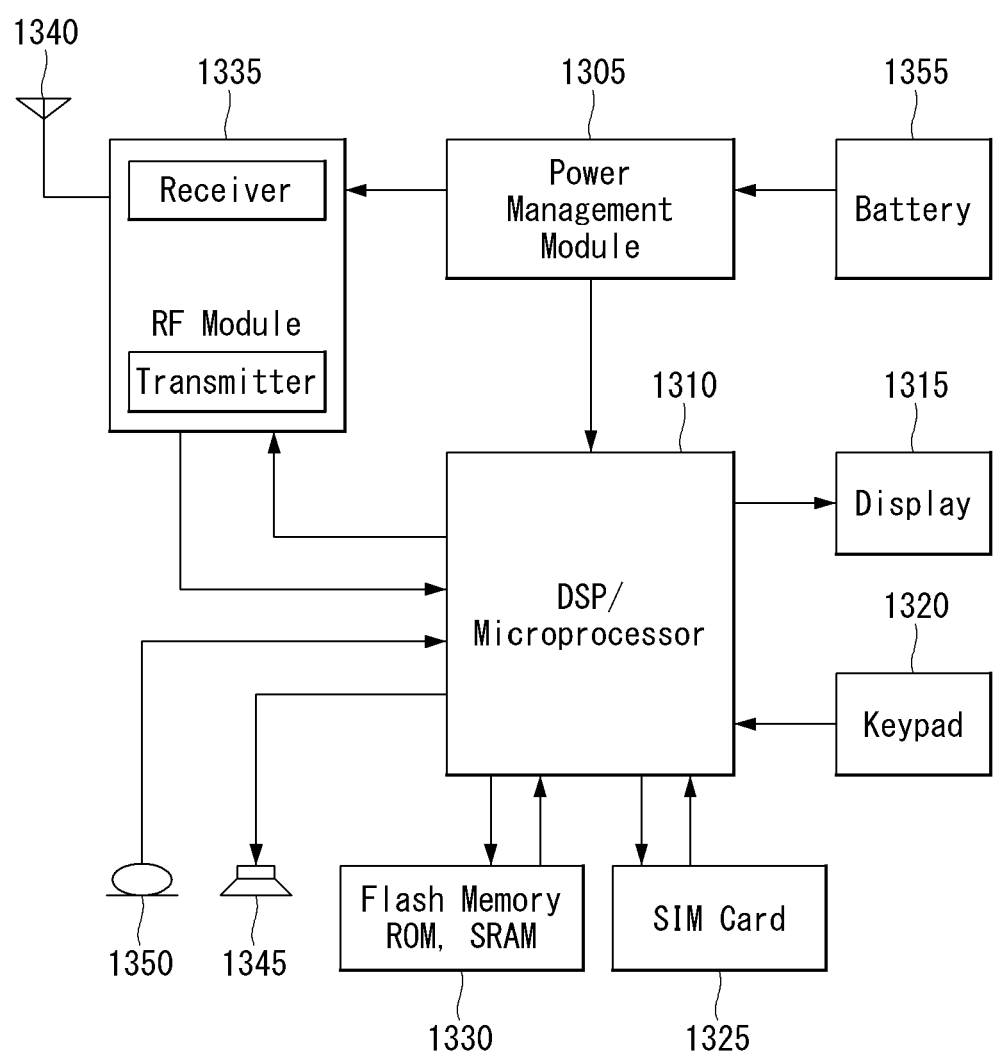
FIG. 13 illustrates a block diagram of a communication device according to an embodiment of the present invention.

FIG. 13 illustrates a block diagram of a communication device according to an embodiment of the present invention.

Particularly, FIG. 13 is a diagram illustrating the UE of FIG. 12 more specifically.

Referring to FIG. 13, the UE may include a processor (or digital signal processor (DSP)) 1310, an RF module (or RF unit) 1335, a power management module 1305, an antenna 1340, a battery 1355, a display 1315, a keypad 1320, a memory 1330, a subscriber identification module (SIM) card 1325 (this element is optional), a speaker 1345, and a microphone 1350. The UE may further include a single antenna or multiple antennas.

The processor 1310 implements the function, process and/or method proposed in FIGS. 1 to 11. The layers of a radio interface protocol may be implemented by the processor 1310.

The memory 1330 is connected to the processor 1310, and stores information related to the operation of the processor 1310. The memory 1330 may be positioned inside or outside the processor 1310 and may be connected to the processor 1310 by various well-known means.

A user inputs command information, such as a telephone number, by pressing (or touching) a button of the keypad 1320 or through voice activation using the microphone 1350, for example. The processor 1310 receives such command information and performs processing so that a proper function, such as making a phone call to the telephone number, is performed. Operational data may be extracted from the SIM card 1325 or the memory 1330. Furthermore, the processor 1310 may display command information or driving information on the display 1315 for user recognition or convenience.

The RF module 1335 is connected to the processor 1310 and transmits and/or receives RF signals. The processor 1310 delivers command information to the RF module 1335 so that the RF module 1335 transmits a radio signal that forms voice communication data, for example, in order to initiate communication. The RF module 1335 includes a receiver and a transmitter in order to receive and transmit radio signals. The antenna 1340 functions to transmit and receive radio signals. When a radio signal is received, the RF module 1335 delivers the radio signal so that it is processed by the processor 1310, and may convert the signal into a baseband. The processed signal may be converted into audible or readable information output through the speaker 1345.

In the aforementioned embodiments, the elements and characteristics of the present invention have been combined in specific forms. Each of the elements or characteristics may be considered to be optional unless otherwise described explicitly. Each of the elements or characteristics may be implemented in a form to be not combined with other elements or characteristics. Furthermore, some of the elements and/or the characteristics may be combined to form an embodiment of the present invention. The sequence of the operations described in the embodiments of the present invention may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

The embodiment according to the present invention may be implemented by various means, for example, hardware, firmware, software or a combination of them. In the case of an implementation by hardware, the embodiment of the present invention may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In the case of an implementation by firmware or software, the embodiment of the present invention may be implemented in the form of a module, procedure or function for performing the aforementioned functions or operations. Software code may be stored in the memory and driven by the processor. The memory may be located inside or outside the processor and may exchange data with the processor through a variety of known means.

It is evident to those skilled in the art that the present invention may be materialized in other specific forms without departing from the essential characteristics of the present invention. Accordingly, the detailed description should not be construed as being limitative from all aspects, but should be construed as being illustrative. The scope of the present invention should be determined by reasonable analysis of the attached claims, and all changes within the equivalent range of the present invention are included in the scope of the present invention.

INDUSTRIAL APPLICABILITY

A scheme performing sidelink communication in a wireless communication system according to the present invention has been illustrated as being applied to the 3GPP LTE/LTE-A system, but may also be applied to various wireless communication systems.

The invention claimed is:

1. A method of performing sidelink communication in a wireless communication system, the method performed by a first user equipment (UE), the method comprising:
   receiving, from a base station, resource pool allocation information indicating at least one resource pool among a plurality of pre-configured resource pools,
   identifying a specific sidelink resource for a second UE in the at least one resource pool, and
   transmitting, to the second UE, a signal for allocating the identified specific sidelink resource,
   wherein the specific sidelink resource is allocated for a signal for performing sidelink measurement between the first UE and the second UE, and
   wherein the signal for performing the sidelink measurement comprises a counter indicating a validity of the corresponding signal.

2. The method of claim 1,
   wherein the at least one resource pool is allocated for a specific UE group to which the first UE and the second UE belong.

3. The method of claim 2,
   wherein the signal for performing the sidelink measurement comprises at least one of identity (ID) information of the specific UE group or UE order information within the specific UE group.

4. The method of claim 1,
   wherein the specific sidelink resource is identified based on a resource order configured for the second UE, and
   wherein the resource order is configured based on a pre-configured resource pattern.

5. The method of claim 1,
   wherein the plurality of pre-configured resource pools comprises one or more sub-resource pools configured for each UE group, and
   wherein the resource pool allocation information is received through higher layer signaling.

6. The method of claim 1, further comprising:
   transmitting, to the second UE, information indicating a new resource pool in which the signal for performing the sidelink measurement is to be transmitted before the counter expires, and
   wherein the new resource pool belongs to the plurality of pre-configured resource pools.

7. The method of claim 1,
   wherein the specific sidelink resource is determined using at least one of a received signal energy value or a channel busy ratio (CBR) value measured with respect to one or more sidelink resources configuring the at least one resource pool.

8. The method of claim 1,
   wherein the plurality of pre-configured resource pools comprises a specific resource pool for a fall-back operation related to the sidelink measurement, and
   wherein the method further comprises transmitting the signal for performing the sidelink measurement in the specific resource pool.

9. A first user equipment (UE) configured to perform sidelink communication in a wireless communication system, the first UE comprising:
   a transceiver for transmitting or receiving a radio signal, and
   a processor functionally connected to the transceiver,
   wherein the processor is configured to:
   receive, from a base station, resource pool allocation information indicating at least one resource pool among a plurality of pre-configured resource pools,
   identify a specific sidelink resource for a second UE in the at least one resource pool, and
   transmit, to the second UE, a signal for allocating the identified specific sidelink resource,
   wherein the specific sidelink resource is allocated for a signal for performing sidelink measurement between the first UE and the second UE, and
   wherein the signal for performing the sidelink measurement comprises a counter indicating a validity of the corresponding signal.

10. The first UE of claim 9,
    wherein the at least one resource pool is allocated for a specific UE group to which the first UE and the second UE belong.

11. The first UE of claim 10,
    wherein the signal for performing the sidelink measurement comprises at least one of identity (ID) information of the specific UE group or UE order information within the specific UE group.

12. The first UE of claim 9,
    wherein the specific sidelink resource is identified based on a resource order configured for the second UE, and
    wherein the resource order is configured based on a pre-configured resource pattern.

13. The first UE of claim 9,
    wherein the plurality of pre-configured resource pools comprises one or more sub-resource pools configured for each UE group, and
    wherein the resource pool allocation information is received through higher layer signaling.

14. The first UE of claim 9, wherein the processor is further configured to:
    transmit, to the second UE, information indicating a new resource pool in which the signal for performing the sidelink measurement is to be transmitted before the counter expires, and
    wherein the new resource pool belongs to the plurality of pre-configured resource pools.

15. The first UE of claim 9,
    wherein the specific sidelink resource is determined using at least one of a received signal energy value or a channel busy ratio (CBR) value measured with respect to one or more sidelink resources configuring the at least one resource pool.

16. The first UE of claim 9,
    wherein the plurality of pre-configured resource pools comprises a specific resource pool for a fall-back operation related to the sidelink measurement, and
    wherein the processor is further configured to transmit the signal for performing the sidelink measurement in the specific resource pool.

* * * * *